(12) United States Patent
Goodenough Welch et al.

(10) Patent No.: US 10,375,560 B1
(45) Date of Patent: Aug. 6, 2019

(54) PERSONAL SAFETY NETWORK

(71) Applicant: Mooseworks Development, LLC, Peterborough, NH (US)

(72) Inventors: Cynthia Goodenough Welch, Peterborough, NH (US); Keith C. Welch, Peterborough, NH (US)

(73) Assignee: Mooseworks Development, LLC, Peterborough, NH (US)

( * ) Notice: Subject to any disclaimer, the term of this patent is extended or adjusted under 35 U.S.C. 154(b) by 0 days.

(21) Appl. No.: 15/996,376

(22) Filed: Jun. 1, 2018

(51) Int. Cl.
| | | |
|---|---|---|
| *H04W 4/90* | (2018.01) | |
| *H04W 12/06* | (2009.01) | |
| *H04L 9/32* | (2006.01) | |
| *H04W 88/02* | (2009.01) | |
| *H04W 4/70* | (2018.01) | |
| *H04W 76/15* | (2018.01) | |
| *H04W 4/80* | (2018.01) | |

(52) U.S. Cl.
CPC ............. *H04W 4/90* (2018.02); *H04L 9/3226* (2013.01); *H04W 4/70* (2018.02); *H04W 4/80* (2018.02); *H04W 12/06* (2013.01); *H04W 76/15* (2018.02); *H04W 88/023* (2013.01)

(58) Field of Classification Search
CPC ........... H04W 4/90; H04W 4/12; G08B 27/00
See application file for complete search history.

(56) References Cited

U.S. PATENT DOCUMENTS

| | | | |
|---|---|---|---|
| 8,483,654 B2 | 1/2013 | Levinson et al. | |
| 8,624,727 B2 | 1/2014 | Saigh et al. | |
| 8,634,810 B2 | 1/2014 | Barkie et al. | |
| 9,679,467 B2 | 6/2017 | Hibbs, Jr. et al. | |
| 9,881,489 B2 | 1/2018 | Hibbs | |
| 2012/0226759 A1* | 9/2012 | Lew | H04W 4/12 |
| 2013/0346333 A1 | 12/2013 | Hassler et al. | |
| 2014/0153457 A1* | 5/2014 | Liu | H04W 4/20 |
| 2014/0161241 A1* | 6/2014 | Baranovsky | H04M 3/5183 |
| 2014/0368337 A1* | 12/2014 | Venkatachari | G08B 27/00 |
| 2015/0109123 A1* | 4/2015 | Ros | G08B 25/016 |

OTHER PUBLICATIONS

Lindsay, Bruce, "Social Media and Disasters: Current Uses, Future Options, and Policy Considerations", Congressional Research Service, Sep. 6, 2011, United States.

* cited by examiner

*Primary Examiner* — Myron Wyche
(74) *Attorney, Agent, or Firm* — Cesari and McKenna, LLP

(57) ABSTRACT

A personal safety network (PSN) is provided in which authorized members of the network may rapidly and efficiently communicate with each other regarding threats, emergencies, or other circumstances. The PSN typically includes mobile devices, such as smartphones or tablets, on which a mobile application is running, an administrative server, and a push notification server. The mobile devices, administrative server, and push notification server cooperate to enable distribution of virtually real-time, multi-way messages among at least the members of a predetermined group of authorized members of the PSN. In addition, multiple PSNs may be linked together to effectively provide a single network for a large geographic area or remotely located, commonly owned or operated facilities.

34 Claims, 23 Drawing Sheets

| Home | Users/Groups | Roles/Permissions | Archived Messages |
|---|---|---|---|

| Time | From | Message | Location |
|---|---|---|---|
| 2:25 PM | Admin | Evacuate immediately using stairwell 2. | Main Office |
| 2:25 PM | Security | There is an unauthorized man on the 2nd floor outside room 202. Evacuate now. | Bldg 201 |
| 2:24 PM | Tim | I see him in the hallway on the 2nd floor. | Bldg 201 |
| 2:23 PM | Security | I'm in the building right now. | Bldg 201 |
| 2:23 PM | Ellen | I see him on the 2nd floor. He has a torn up plaid shirt, and is carrying a duffel bag. | Bldg 201 |
| 2:22 PM | Security | I'll check it out. | Front Gate |
| 2:22 PM | Lisa | He just went up the stairs at stairwell 1. | Bldg 201 |
| 2:22 PM | Lisa | I see a man who doesn't look like he belongs here on the 1st floor. | Bldg 201 |

Enter Message:

Groups: ☑ All  ☐ Admin  ☐ Security
       ☐ Teachers  ☐ Students  ☐ Family

[Reply]  [Broadcast]
☑ Emergency

FIG. 4B

| Home | Users/Groups | Roles/Permissions | Archived Messages |

Manage Group

Name [Family]   Role [Family ▼]   [Save]   [Import Users]

Group Users

| Name | ID | Email | Phone | | |
|---|---|---|---|---|---|
| Lisa K | 9325 | lisa@apple.com | 555-9325 | Edit | Delete |
| Jim W | 6885 | jim@gmail.com | 555-6885 | Edit | Delete |
| Alice M | 3247 | alice@microsoft.com | 555-3247 | Edit | Delete |
| Sam G | 1021 | sam@yahoo.com | 555-1021 | Edit | Delete |
| | | | | Add | |

Requests for New Users

| Member: | Name | Email | Phone | Relation | | |
|---|---|---|---|---|---|---|
| Lisa K | Dan G | dan@gmail.com | 555-1985 | Father | Approve | Disapprove |

FIG. 4D

| Role Name | Admin | Add User | Approve User | Broadcast |
|---|---|---|---|---|
| Admin | ✓ | ✓ | ✓ | ✓ |
| Staff | ☐ | ☐ | ☐ | ✓ |
| Students | ☐ | ✓ | ☐ | ✓ |
| Family | ☐ | ☐ | ✓ | ☐ |
| Enter New Role Name | | | | ☐ |

Home | Users/Groups | Roles/Permissions | Archived Messages

Add

Save 440
402
442
444

FIG. 4E

| Home | Users/Groups | Roles/Permissions | Archived Messages |

Search for: 🔍

Search Date: 03/10/2014

Search User:

| Date | Time | From | Last Message | |
|---|---|---|---|---|
| 5/18/18 | 3:25 PM | Lisa K | I see a man who doesn't look like he belongs here on the 1st floor. | Go to |
| 5/15/18 | 12:05 PM | Sam G | OK, thanks | Go to |
| 5/5/18 | 9:45 AM | Security | The fire is out now. All clear | Go to |
| 4/30/18 | 10:13 AM | Admin | Evacuate immediately using stairwell 2. | Go to |
| 4/25/18 | 1:23 PM | Security | It's the electrician. We're good. | Go to |
| 4/21/18 | 8:15 AM | Jim W | I see him on the 2nd floor. He has a torn up plaid shirt, and is carrying a duffel bag. | Go to |
| 4/17/18 | 2:36 PM | Mary G | Oh, good. | Go to |
| 4/15/18 | 3:42 PM | Security | I'll check it out. | Go to |
| 4/12/18 | 9:05 AM | Dan G | OK, I'll come by later today. | Go to |
| 4/5/18 | 11:15 AM | Admin | There will be a fire alarm test this afternoon. | Go to |
| 4/2/18 | 7:55 AM | Security | We've removed them. | Go to |

FIG. 4F

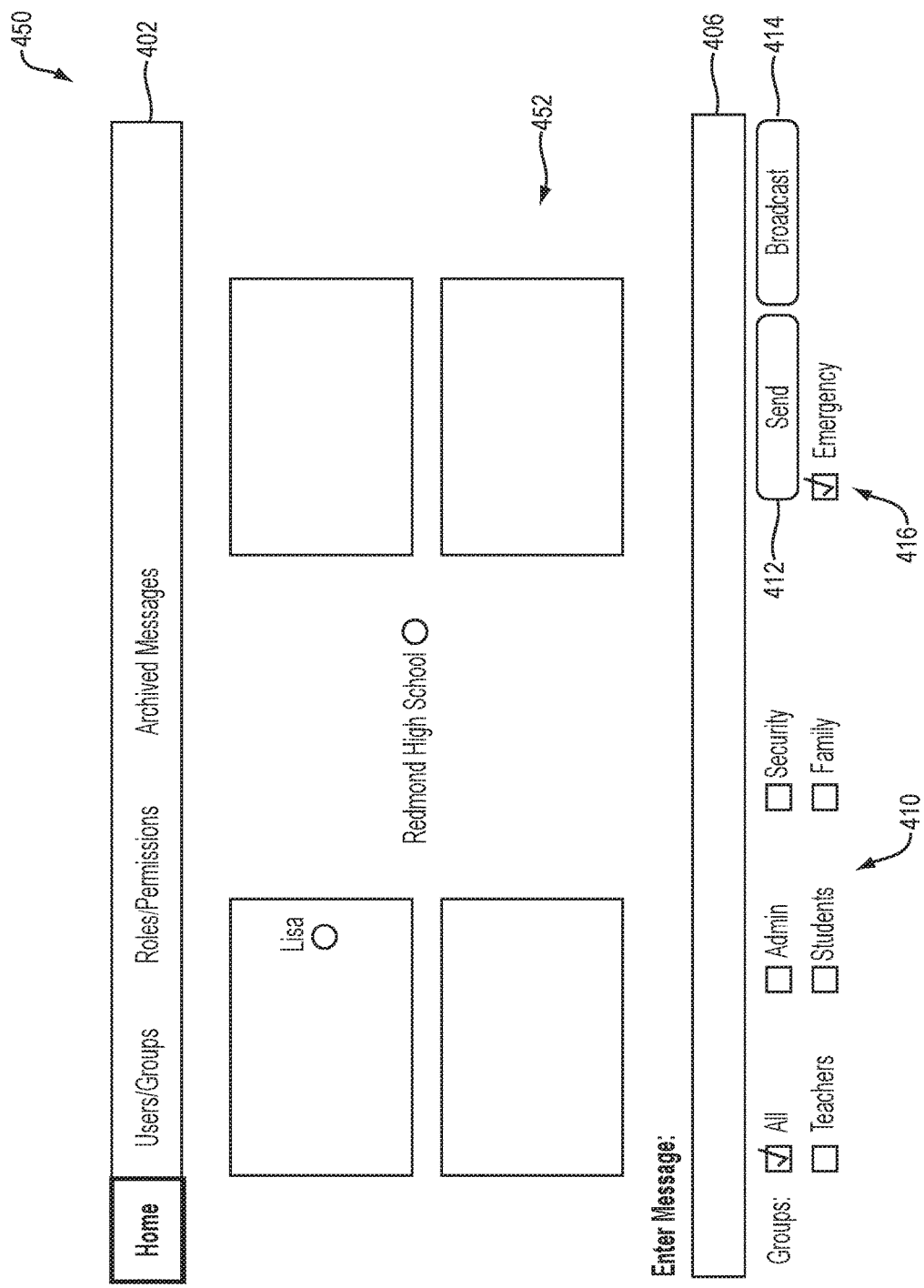

PERSONAL SAFETY NETWORK

BACKGROUND OF THE INVENTION

Field of the Invention

The present invention relates generally to the field of personal communications and, more specifically, to a personal safety network through which groups of individuals may rapidly communicate and share information regarding an emergency or other circumstance.

Background Information

When an incident occurs at a school, business, or other facility that affects or may affect the safety of the people at the facility, there is a need for rapid communication. For example, a student sees someone in the school, or heading towards the school, and the student is concerned. The student may not know the person, and believes the person doesn't belong in the school, or perhaps the student knows the person, and feels threatened. The student needs to be able to report this situation to someone who can do something rapidly. Calling 911 may seem like an overreaction, and finding the appropriate person on a campus may take too much time. Ideally, the student should be in contact with a trusted individual, and quickly receive a response that indicates that there is no actual threat, or that there is a threat and instructions about what to do.

Similarly, a student may observe someone in the school, or heading towards the school, who is carrying a weapon of some kind, or the student sees a fire or hears an explosion. The student needs to be able to report this circumstance immediately, and may need to let everyone in the school know what is happening, and where. Other students, as well as staff or faculty, may want to add information regarding what they see and hear. School administration or security personnel may wish to send instructions to all students. A common theme in this type of scenario is that there is chaos, and limited or inaccurate information. Instead of knowing there are shots fired in a particular part of a large building or multi-building campus, many people may be completely unaware that something is happening. Further, loud sounds generated by fire alarms or other emergency alarms may interfere with intercoms and public address systems, thus blocking effective communication through those channels.

SUMMARY OF THE INVENTION

In accordance with one aspect of the invention, a personal safety network (PSN) is provided in which authorized participants of the network may communicate with each other regarding threats, emergencies, or other circumstances. The PSN typically includes mobile, wireless communication devices such as smartphones, an administrative server, and a push notification server. The mobile devices, administrative server, and push notification server cooperate to enable distribution of virtually real-time, multi-way messaging among at least a predetermined group of authorized participants of the PSN which is selected by an originator of a message. The rapidity and efficiency of this communication, along with the ability for multiple authorized participants of the PSN to share their respective observations, warnings, and other information about an unfolding event, is highly advantageous.

Each mobile device of the PSN runs a mobile application which enables an authorized member to originate (compose) messages, and select an individual authorized participant of the PSN, a predetermined group of authorized participants, or all of the authorized participants to receive a given message. Messages are transmitted by the mobile device to the administrative server or, alternatively, to a push notification server with which the (client) mobile device is registered. For enhanced security, messages may be encrypted by the mobile application prior to transmission.

An administrative application, running on the administrative server, maintains records and data structures regarding mobile device registrations, authorized participants of the network and their respective PSN permissions, and predetermined groups of authorized participants which are defined by authorized participants. The administrative application may also receive messages originating from registered mobile devices. Upon receipt of a message, the administrative server stores a copy of the message in a message archive. The administrative server decrypts the initial message, if necessary for storage, and converts it into a push notification distribution. The push notification distribution includes both the content of the initial message and information necessary to effect distribution of the message to each of the authorized participants of the predetermined group designated by the authorized participant who originated the initial message. In response to receiving a push notification distribution from the administrative server, the push notification server, based on information contained in the push notification distribution, proceeds to push notifications to the mobile devices associated with the predetermined group of other authorized participants. A push notification server may also push notifications to mobile devices associated with authorized participants in response to a message received directly from a mobile device which previously registered with the push notification server. Each mobile device's mobile application, if necessary, decrypts the received push notification and displays it.

An authorized participant receiving a push notification based on an initial message may, in turn, originate a response message which, similar to the process summarized above, is sent to all of the other authorized participants who are members of the predetermined group which received the initial message. Alternatively, an authorized participant may send a response message only to the mobile device which originated the initial message. As an additional alternative, an authorized participant may send a response message to all authorized participants of the PSN.

In accordance with another aspect of the invention, beginning with an initial message, and continuing with any response message(s) received, the mobile device may display all such messages in a reverse chronological, continuing conversation format. This capability advantageously enables multiple authorized participants to coherently share their respective observations, warnings, or other information regarding a rapidly evolving event.

Further enhancing the usefulness of the message-based communications provided by the PSN, each displayed message may include an individual or group name, or other identifier of the authorized participant who originated the message, a time stamp, the text of the message, information regarding a geographic location of a mobile device at the time when a message was originated from that device, or other information.

In accordance with another aspect of the invention, permission to establish or modify the membership of predetermined groups of authorized participants may be assigned as part of PSN permissions. For example, any authorized participant of the PSN may have permission to request to join to an existing group, but such a request must be approved by an authorized participant having permission to modify the membership of that group.

In accordance with another aspect of the invention, the mobile application may query or poll the administrative server to check for a missed message. By comparing a message identifier of the last message received by the mobile application to the administrative server's stored messages, the administrative application may determine whether the mobile application failed to receive a previously sent message. If so, the administrative application will respond to the mobile application with the missing message(s). Polling for missed messages serves as a form of redundancy or safeguard since push notifications do not typically include an acknowledgement of successful reception by the intended recipient.

In accordance with another aspect of the invention, a first PSN may be linked to a second (or greater) PSN. Through such linking, a universe of authorized members may be expanded to cover larger geographical areas, or commonly owned or administered facilities that are remote from each other. For example, a school district may choose to implement a PSN for each individual school, which may be administered by a staff person who is familiar with that school's students, parents, staff, and faculty. The school district may choose to link all of the individual schools' PSNs together to enable district wide message broadcasting. Similar to an authorized participant requesting to join an existing group, an authorized participant of a first PSN having the necessary permission may transmit a request to link to a second PSN. Once the request is granted, the first and second PSNs are linked.

BRIEF DESCRIPTION OF THE DRAWINGS

The invention description below refers to the accompanying drawings, of which:

FIG. 4B is a representation of a message thread page generated by the PSN administrative application shown in FIG. 2;

FIG. 4D is a representation of a manage group page generated by the PSN administrative application shown in FIG. 2;

FIG. 4E is a representation of a roles/permissions page generated by the PSN administrative application shown in FIG. 2;

FIG. 4F is a representation of an archive messages page generated by the PSN administrative application shown in FIG. 2;

FIG. 4G is a representation of an authorized participant location page generated by the PSN administrative application shown in FIG. 2;

DETAILED DESCRIPTION OF ILLUSTRATIVE EMBODIMENTS

Figure 1:
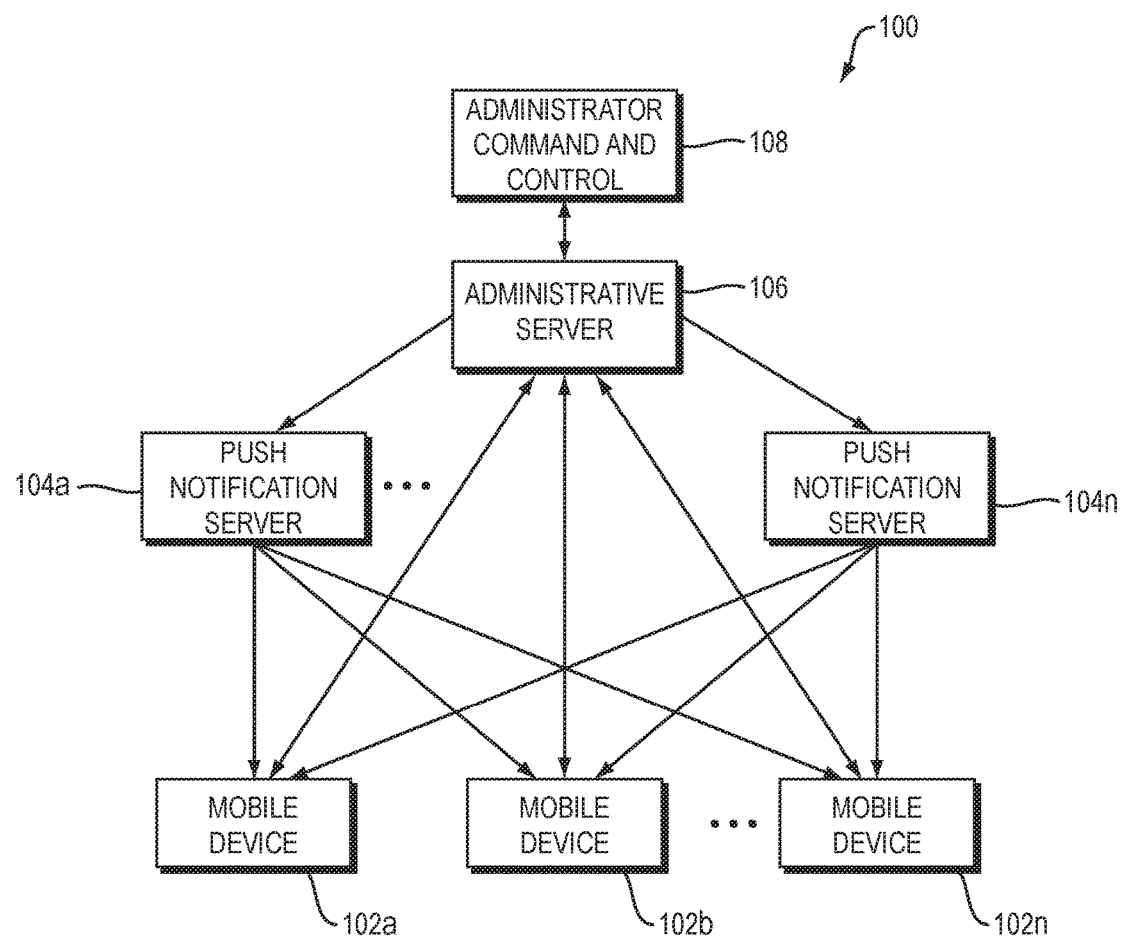
FIG. 1 is a block diagram of a personal safety network (PSN) in accordance with one aspect of the present invention.

FIG. 1 shows a block diagram of a personal safety network (PSN) 100 which includes mobile devices 102*a*, 102*b* . . . 102*n*, push notification servers 104*a* . . . 104*n*, an administrative server 106, and an administrator command and control unit 108. Each of mobile devices 102*a* . . . 102*n* may be based on a smartphone or other wireless communication device which is capable of sending text messages and receiving push notifications. Each of push notification servers 104*a* . . . 104*n* may be based on hardware and software available from a wide variety of commercial sources. Alternatively, one or more of push notification servers 104*a* . . . 104*n* may represent a third party owned or operated server which is compatible with iOS®, Android® or another operating system which is in use among mobile devices 102*a* . . . 102*n*. Administrative server 106 and administrator command and control unit 108 may be based on hardware and software available from a wide variety of commercial sources.

In general, each of mobile devices 102*a* . . . 102*n* is associated with an authorized participant (not shown) of PSN 100. As described in more detail below, each of mobile devices 102*a* . . . 102*n* runs a mobile application (not shown) which enables the devices to register with administrative server 106. Alternatively, mobile devices 102*a* . . . 102*n* may use the mobile application to register with one or more of push notification servers 104*a* . . . 104*n* by presenting a unique device ID along with UserID, GroupID, and SubGroupID tags.

Once registered, each mobile device 102*a* . . . 102*n* may transmit messages, each of which is addressed to an individual authorized participant of PSN 100, a predetermined group of authorized participants of PSN 100, or all authorized participants of PSN 100, to administrative server 106 which is running an administrative application (not shown). In turn, administrative server 106, in cooperation with push notification servers 104a . . . 104n, functions to distribute each message to the members of the predetermined group of authorized participants to which it is addressed, effectively enabling virtually real-time, multi-way messages among such authorized participants.

Alternatively, mobile devices 102a . . . 102 which registered with one or more of push notification servers 104a . . . 104n may transmit messages directly to those servers. Again, each message may be addressed to an individual authorized participant of PSN 100, a predetermined group of authorized participants of PSN 100, or all authorized participants of PSN 100.

Figure 2:
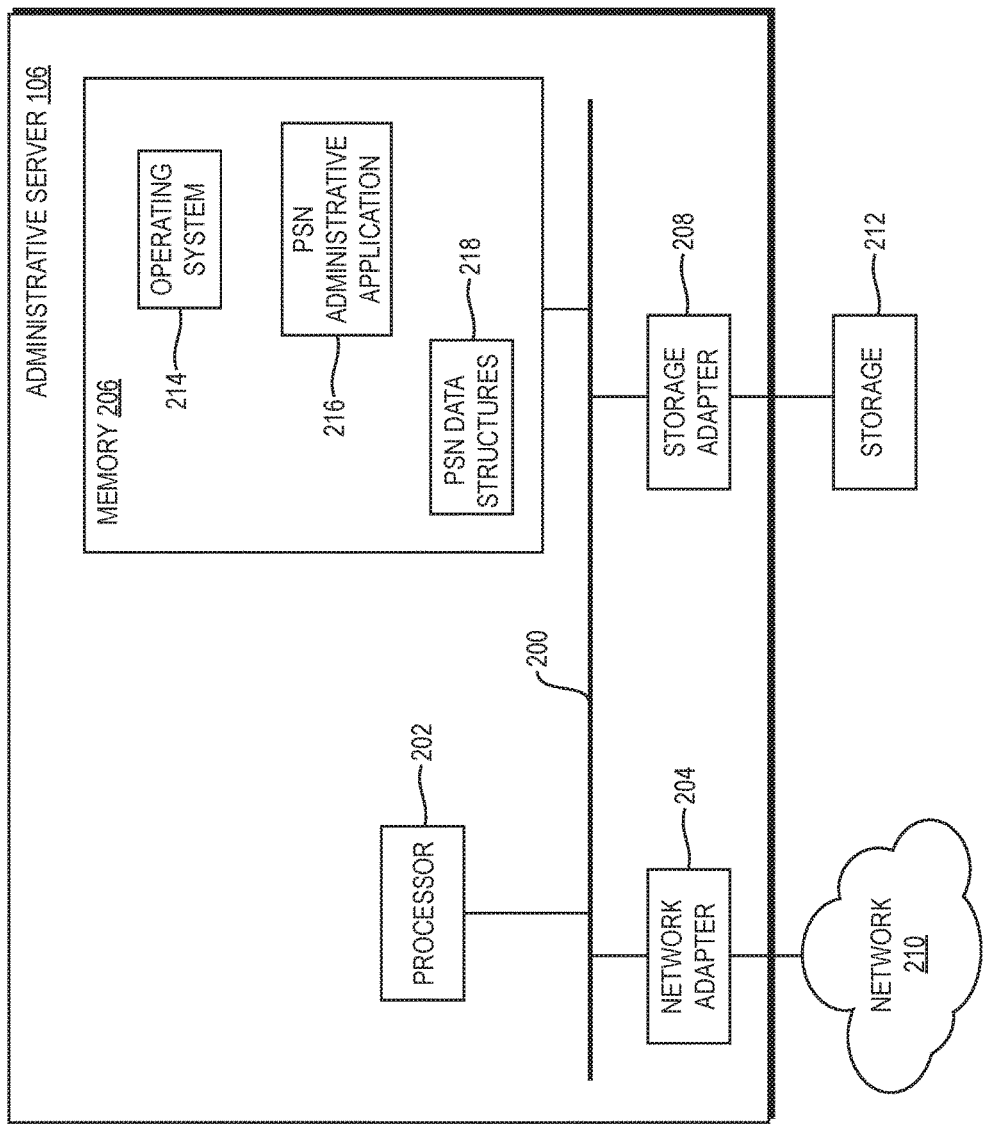
FIG. 2 is a block diagram of the administrative server shown in FIG. 1.

FIG. 2 is a block diagram of administrative server 106 shown in FIG. 1. For enhanced clarity and conciseness, an element introduced in a previous figure retains the same reference number throughout this specification. Administrative server 106 includes a bus 200 which interconnects a processor 202, a network adapter 204, a memory 206, and a storage adapter 208. Network adapter 204 interfaces with network 210 which may represent the Internet or another public or private network. Storage adapter 208 interfaces with storage 212 which may represent disk, flash memory, or other mass storage media. Memory 206 includes an operating system 214, a PSN administrative application 216, and PSN data structures 218.

Figure 3:
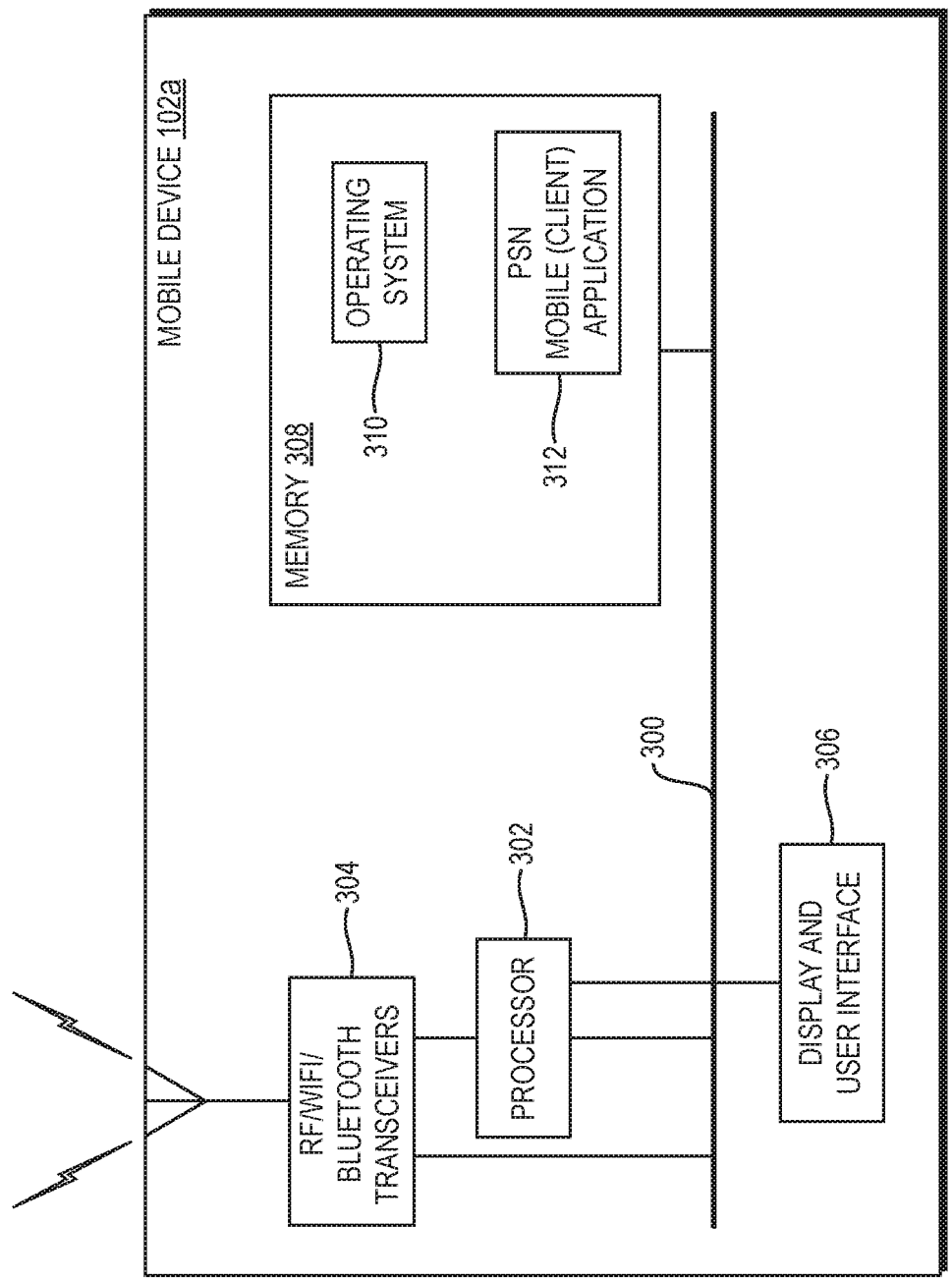
FIG. 3 is a block diagram of a representative one of the mobile devices shown in FIG. 1.

FIG. 3 is a block diagram of mobile device 102a shown in FIG. 1. Mobile device 102a includes a bus 300 which interconnects a processor 302, RF/WiFi™/Bluetooth® transceivers 304, a display and user interface 306, and a memory 308. Memory 308 includes an operating system 310 and a PSN mobile (client) application 312. Operating system 310 may represent iOS®, Android® or another commercially available operating system. PSN mobile application 312 may be downloaded and installed from third party application stores, such as those owned or operated by Apple Inc. or Google, or other websites.

Figure 4A:
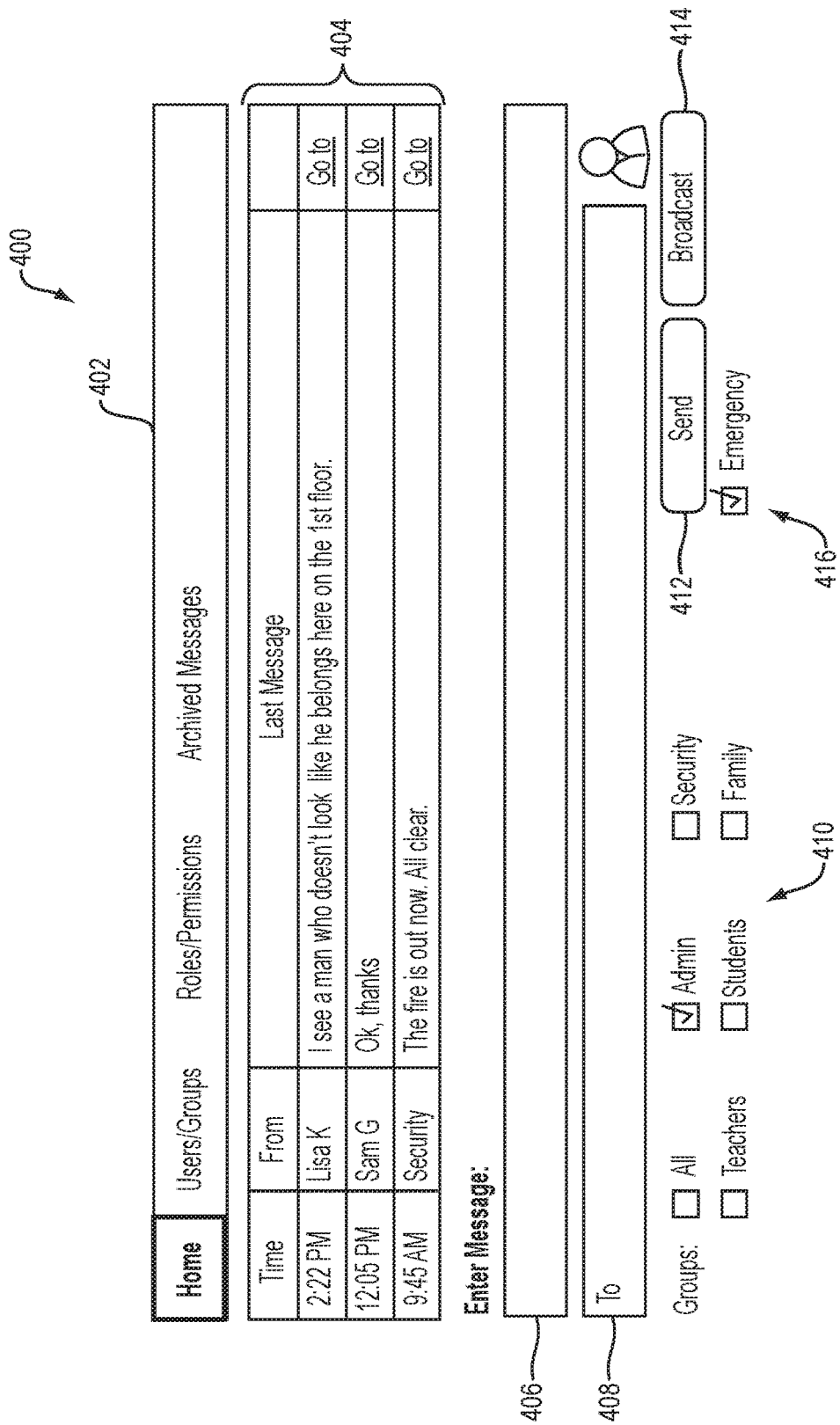
FIG. 4A is a representation of a home page generated by the PSN administrative application shown in FIG. 2.

FIGS. 4A-4F are representations of various pages generated by the PSN administrative application 216 shown in FIG. 2. Turning first to FIG. 4A, a representation of an administrative home page 400 is shown. A top level navigation menu 402 is displayed above a recent message threads list 404. Recent message threads list 404 displays, in reverse chronological order, a time stamp, message originator, and message text for the most recent message received by administrative application 216 for a given thread. By clicking a "Go to" link corresponding to a given thread displayed in recent message threads list 404, an administrator may view, and optionally contribute to, that thread as discussed below in connection with FIG. 4B. Throughout this specification, it should be understood that references to "pressing" or "tapping" buttons or "clicking" links are merely exemplary and that such terms include any action which results in actuation or activation of a control.

A new message box 406 is provided for an administrator (not shown) to compose new messages. An intended recipients box 408 is provided which enables an administrator to specify either an individual authorized member of PSN 100 or, using checkboxes 410, a predetermined group of authorized members, as the intended recipient(s) of the next message sent by the administrator. An emergency priority checkbox 416, if checked, specifies that the next message sent by the administrator has highest priority for delivery to the intended recipients. By tapping a send button 412, an administrator sends a new message (as it appears in new message box 406) to the intended recipient(s). By tapping a broadcast button 414, an administrator may send a new message to all authorized participants of PSN 100.

Turning next to FIG. 4B, a representation of a message threads page 418 is shown. Most of the elements of message threads page 418 are common to administrative home page 400. However, a message list 420 displays, in reverse chronological order, a time stamp, message originator, message text, and message originator location for each message of the displayed thread. An administrator may use message threads page 418 to simply review what transpired or, alternatively, to compose and send a new message on the displayed thread.

Figure 4C:
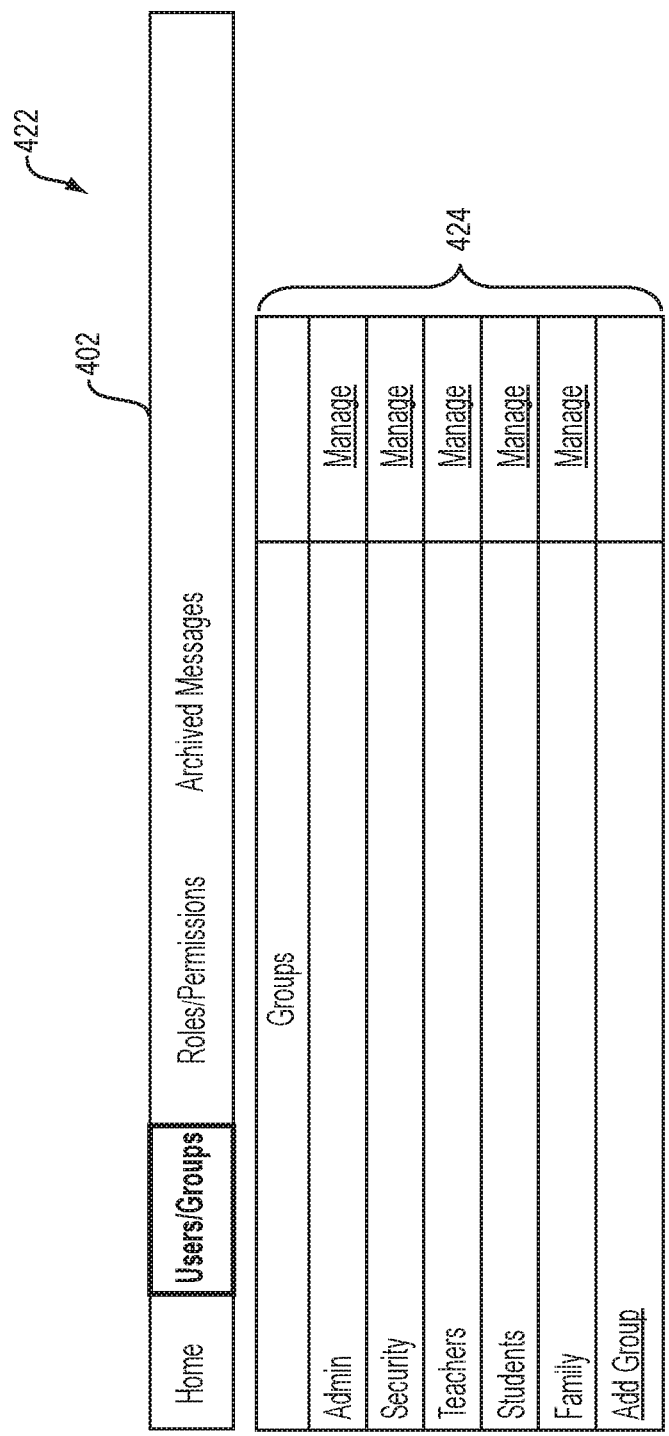
FIG. 4C is a representation of a users/groups page generated by the PSN administrative application shown in FIG. 2.

FIG. 4C is a representation of a users/groups page 422. A groups list 424 displays the names of previously defined groups of authorized participants of PSN 100. For example, a group named "Admin" may contain authorized participants of PSN 100 who hold administrator permissions. A group named "Security" may contain authorized participants of PSN 100 who are also security personnel. By clicking an "Add Group" link, an administrator may create a new group. By clicking a "Manage" link, an administrator may make changes to an existing group as shown in FIG. 4D.

FIG. 4D shows a representation of a manage group page 426 generated by the PSN administrative application 216 shown in FIG. 2. The manage group page 426 shows information for a group named "Family" as indicated by a group name box 428. A group role box 430 shows the role of this group is "Family". By tapping a "Save" button 432, an administrator may save any changes made to the displayed group. By tapping an "Import Users" button 434, an administrator may import additional authorized participants into the displayed group from a spreadsheet or other data source (not shown).

A group members (users) list 436 displays, for each group member, a name, a unique PSN identification number, an email address, and a phone number. Each entry on list 436 also includes an "Edit" link and a "Delete" link by which an administrator may, respectively, edit a group member's information or delete a member from the group.

A request to add new members (users) list 438 shows information on authorized participants of PSN 100 for whom a request for membership in the displayed "Family" group has been made. Specifically, a group member "Lisa K." who is an existing member of the displayed "Family" group has requested that a new member "Dan G.", who is identified as the father of "Lisa K.", be added to the "Family" group. An administrator may approve or disapprove the request by clicking on the corresponding button displayed at the right. Once a new group member is approved, he or she becomes an authorized participant of PSN 100.

FIG. 4E shows a representation of a roles/permissions page 440 generated by the PSN administrative application shown in FIG. 2. A roles list 442 contains the available choices for the role box 430 shown in FIG. 4D. That is, the roles shown in roles list 442 represent the available choices for the role to be assigned to a given group of authorized participants of PSN 100. Each role in roles list 442 includes a role name, and a series of check boxes which specify PSN 100 permissions associated with a given role. A new role may be added to roles list 442 by clicking an "Add" link. Changes to the indicated permissions of any roles on list 442 may be saved by clicking "Save" button 444.

FIG. 4F shows a representation of an archive messages page 446. Archive messages page 446 allows an administrator to view older messages (e.g., messages older than 24 hours) and to search by keyword using a search box 450. In addition, an administrator may filter the messages displayed in an archived message list 448 using a date filter 452 or a user filter 454 (or both). When an archived message of interest appears in archived message list 448, an administrator may click on a displayed "Go to" link and view a thread containing the message of interest as described above in connection with FIG. 4B.

FIG. 4G shows a representation of an authorized participant location page 450. Using geographical location information which is appended to messages originated by PSN mobile application 312, as described below, PSN administrative application 216 shows the physical location of an authorized participant of PSN 100 as of the time that authorized participant sent a particular message.

Figure 5A:
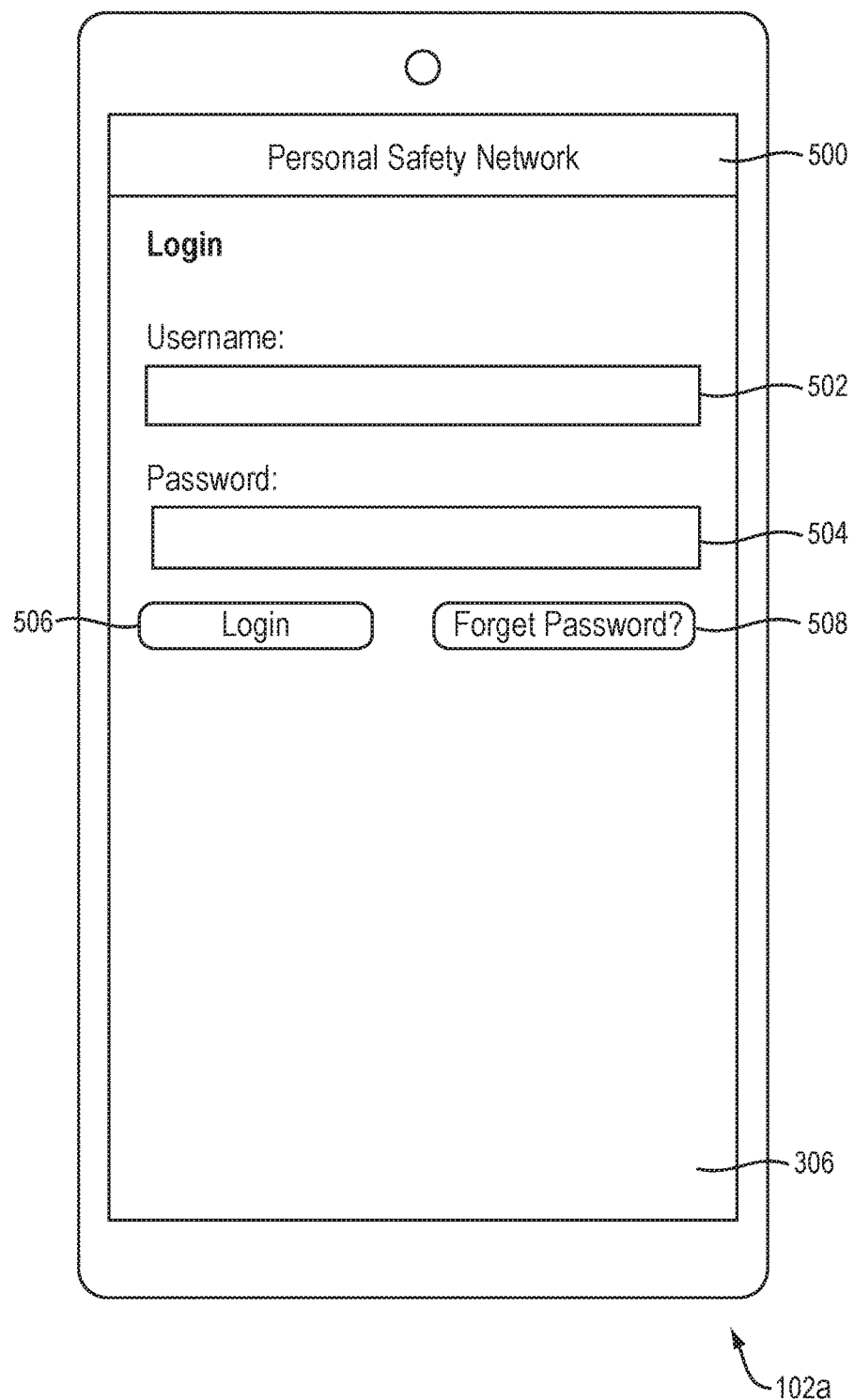
FIG. 5A is a representation of a login page generated by the PSN mobile application shown in FIG. 3.

FIGS. 5A-5E are representations of various pages generated by PSN mobile application 312 shown in FIG. 3. FIG. 5A shows a representation of a login page 500 as it may appear on display and user interface 306 of mobile device 102*a*. A username box 502 accepts typed entry of a username assigned to an authorized participant of PSN 100. Similarly, a password box 504 accepts typed entry of a password assigned to or selected by the authorized member. A newly authorized participant of PSN 100 may receive a username and initial password by email as part of the process described above in connection with FIG. 4D.

When pressed, a "Login" button 506 causes PSN mobile application 312 to contact administrative server 106 and present the entered username and password credentials for validation. As part of a successful initial login by a new authorized participant of PSN 100, the administrative server 106 may prompt the authorized participant to establish a new password. After a successful initial login, a "Forgot Password?" button may be pressed to recover an existing password or establish a new password.

Figure 5B:
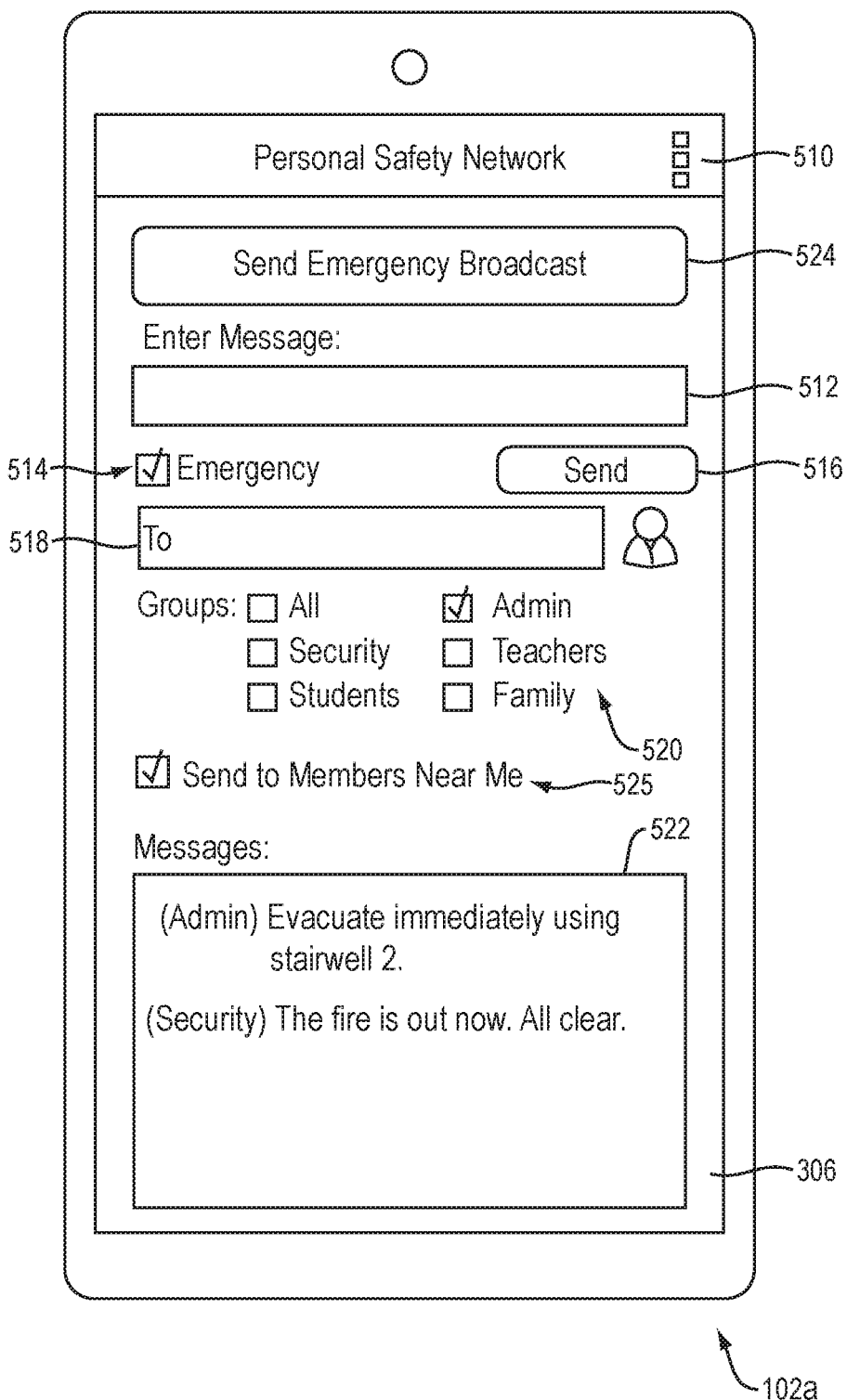
FIG. 5B is a representation of a home page generated by the PSN mobile application shown in FIG. 3.

Following a successful login, a mobile home page 510, as shown in FIG. 5B, may be displayed by display and user interface 306. Similar to administrative home page 400 discussed above, a new message box 512 is provided for an authorized participant (not shown) of PSN 100 to compose new messages. An intended recipients box 518 is provided which enables an authorized member to specify either another, individual authorized participant of PSN 100 or, using checkboxes 520, a predetermined group of authorized participants, as the intended recipient(s) of the next message sent. An emergency priority checkbox 514, if checked, specifies that the next message sent has highest priority for delivery to the intended recipients. In addition, without intervention by an authorized participant, PSN mobile application 312 may automatically append to each message a current latitude and longitude of the mobile device 102*a* . . . 102*n* originating the message. Leveraging such geographical information, a checkbox 525, when checked, enables an authorized participant of PSN 100 to send a message to other authorized participants of PSN 100 who are in close geographical proximity.

By pressing a "Send" button 516, an authorized participant of PSN 100 sends a new message (as composed in new message box 512) to the intended recipient(s) and starts a thread.

A received messages box 522 displays, in reverse chronological order, messages received through PSN 100 by PSN mobile application 312. As displayed, each received message includes a parenthetical (e.g., "(Admin)") advantageously showing the predetermined group from which the message originated. Knowledge of the source of a particular message may be of critical importance for a message recipient in determining what action, if any, to take.

In an emergency situation in which there may not be time, or it is unsafe, to compose a message, a "Send Emergency Broadcast" button 524 may be pressed. Such action will immediately broadcast an emergency message (i.e., a default message such as "An emergency is in progress") to all authorized participants of PSN 100. Pressing or otherwise activating either send button 516 or "Send Emergency Broadcast" button 524 will cause PSN mobile application 312 to transition to a mobile messages page 526 as shown in FIG. 5D discussed below.

Figure 5C:
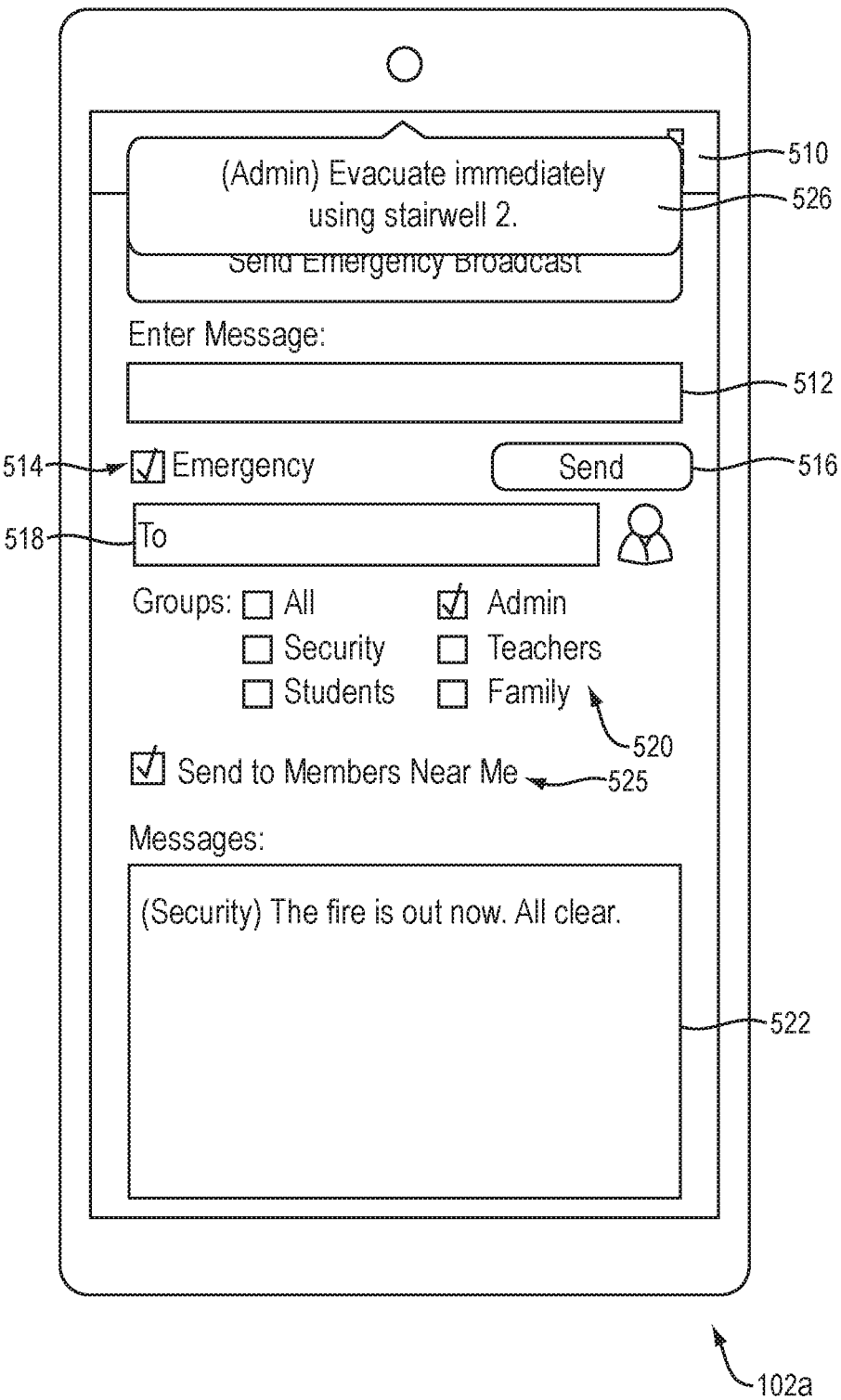
FIG. 5C is a representation of the home page shown in FIG. 5B following receipt of a message from a PSN administrator.

As shown in FIG. 5C, mobile home page 510 displays messages received by push notifications from PSN 100 (i.e., received from push notification servers 104*a* . . . 104*n*), as illustrated by push notification 526. All pages of PSN mobile application 312 will display received push notifications from PSN 100 when that application is open. Such push notifications will be received by mobile devices 102*a* . . . 102*n* even when PSN mobile application 312 is not open. Tapping push notification 526 will cause PSN mobile application 312 to open and transition to a mobile messages page 528 as shown in FIG. 5D.

Figure 5D:
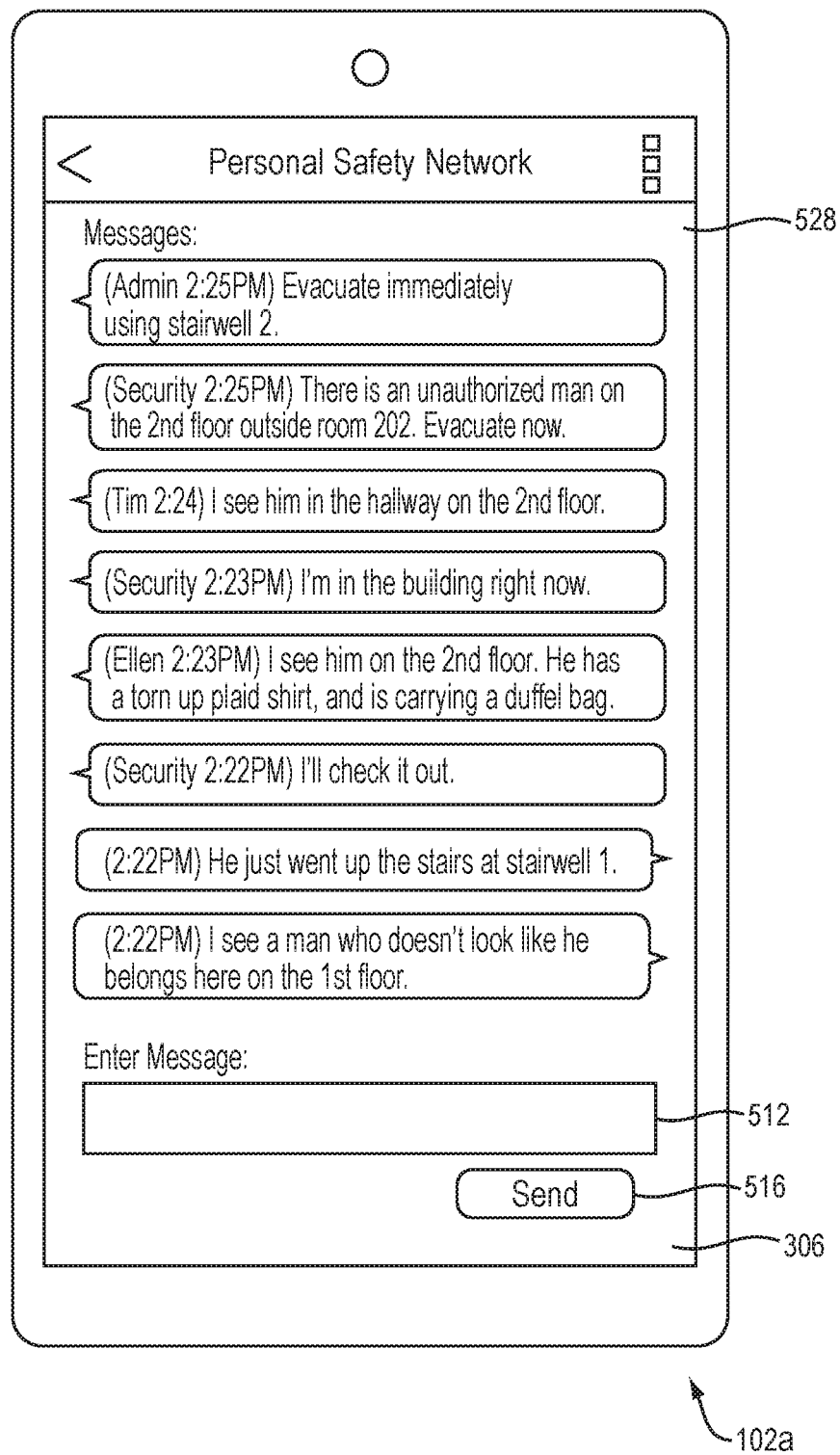
FIG. 5D is a representation of a messages page generated by the PSN mobile application shown in FIG. 3.

As shown in FIG. 5D, mobile messages page 528 displays the most recent messages of a thread in reverse chronological order. The displayed messages originated from any authorized participant of PSN 100 who is also a member of a predetermined group to whom an initial message was addressed, or any authorized participant of PSN 100 if the initial message was addressed to the group "All". New message box 512 may be used to compose a message which, when sent by pressing "Send" button 516, will be added to the thread.

As also shown in FIG. 5D, each displayed message includes a parenthetical advantageously showing the predetermined group or individual from which the message originated as well as a time stamp. In addition, the display of messages in a "chat" or continuing conversation format provides important information about how a situation is evolving in time, whether a threat is worsening or abating, when and where help should be expected to arrive, and the like. In this fashion, virtually real-time, multi-way messaging among at least the members of a predetermined group of authorized participants of PSN 100 is provided.

Figure 5E:
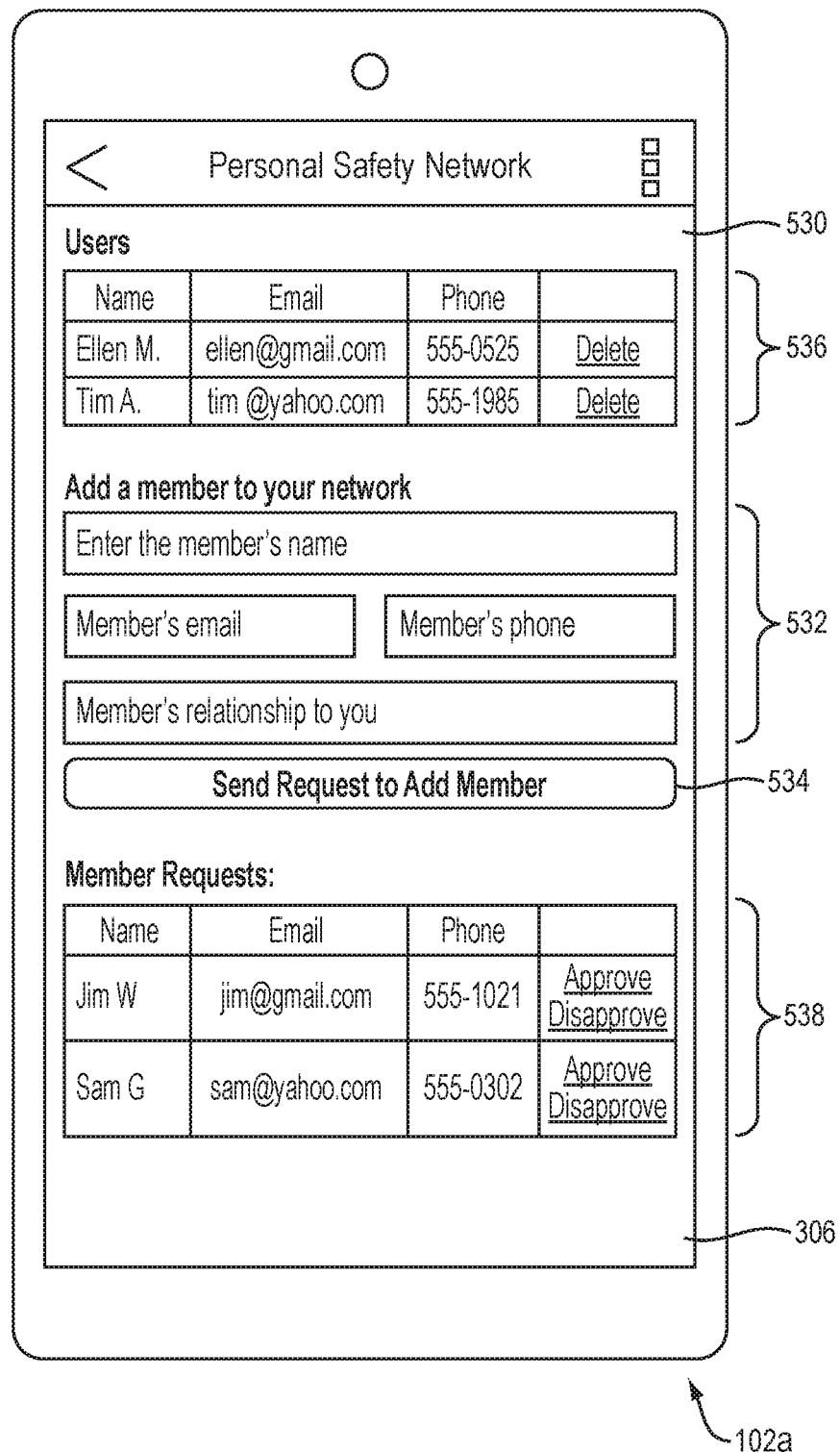
FIG. 5E is a representation of a users page generated by the PSN mobile application shown in FIG. 3.

FIG. 5E shows a mobile users page 530 which may be used to manage an authorized participant's PSN account. A family list 536 displays the current members (users) of a previously established "Family" group for a given authorized member. A potential new member of the "Family" group may be nominated by filling in the information required by boxes 532 (i.e., name, email address, phone number, and relation to person making nomination) and pressing a "Send Request to Add Member" button 534. That action will cause a request to be transmitted to both the "Family" group and the "Admin" group (FIG. 4D) for approval/disapproval. In FIG. 5E, two pending requests 538 to add new members are shown along with links to approve or disapprove. If members of the "Family" group have PSN permission to approve a new member, as shown in FIG. 4E, then they may do so. If not, a member of the "Admin" group must approve or disapprove the requests.

Figure 6:
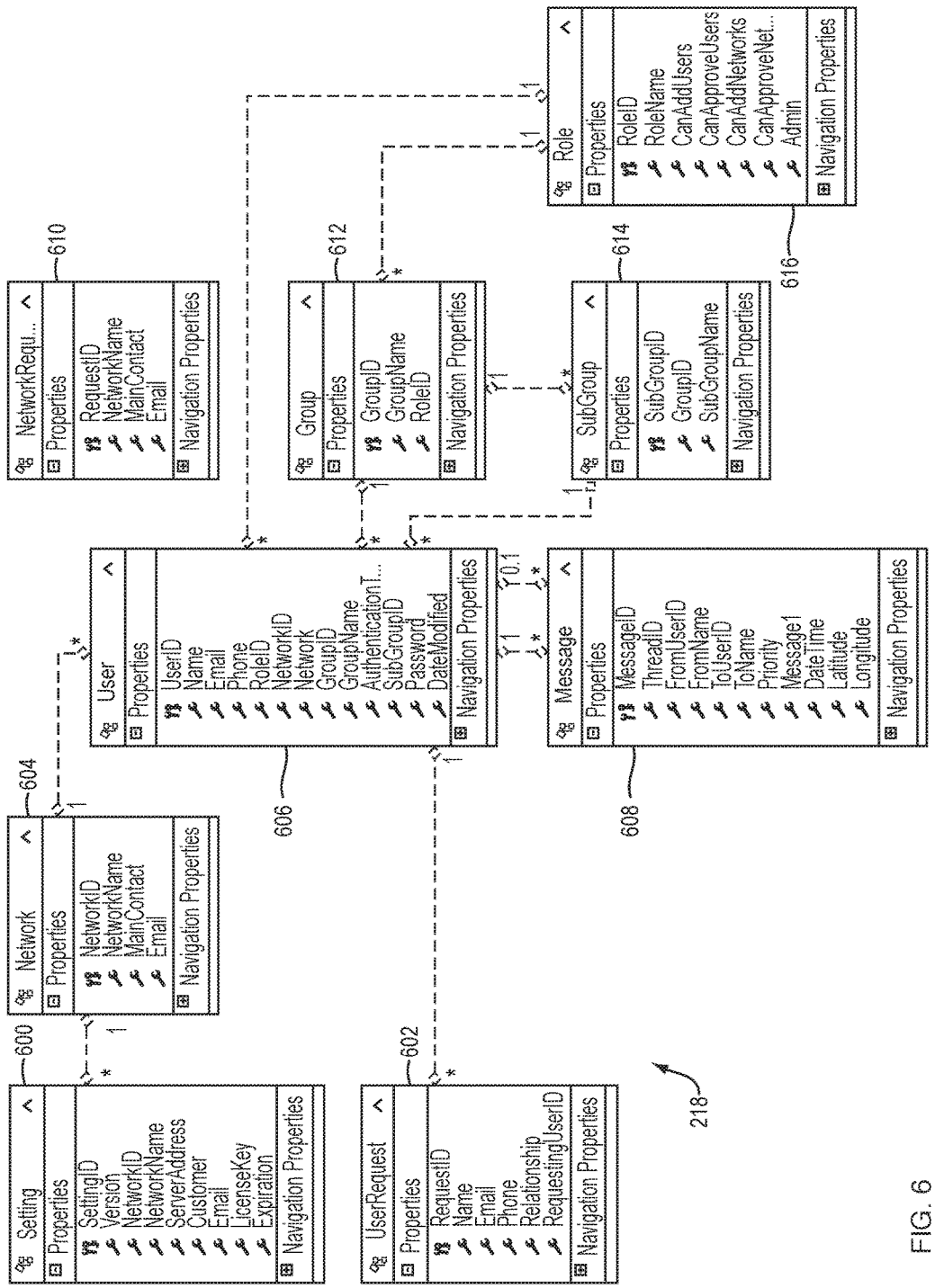
FIG. 6 illustrates examples of the PSN data structures shown in FIG. 2.
Figure 7A:
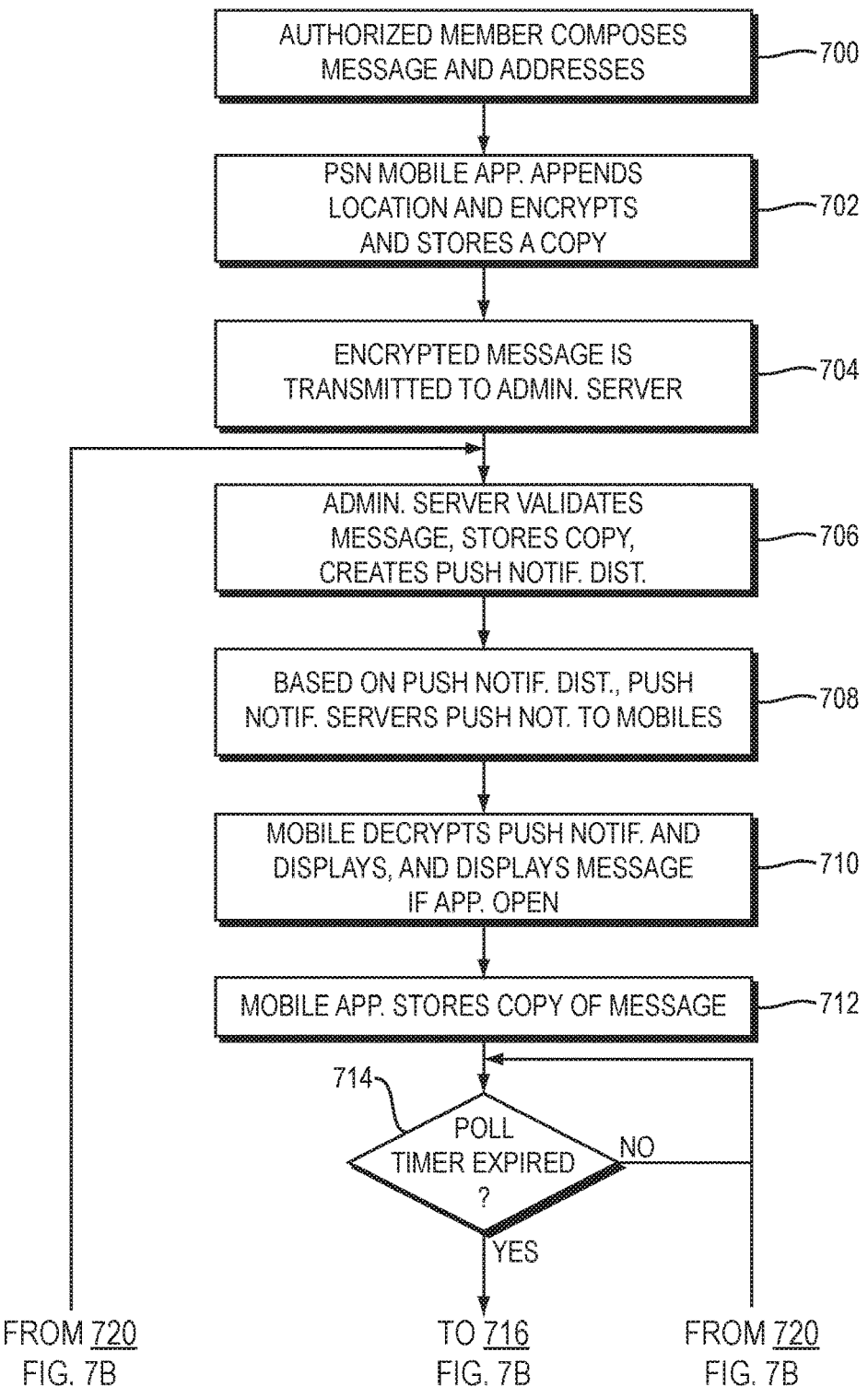
FIGS. 7A and 7B are a flowchart illustrating higher level interactions among components of the PSN shown in FIG. 1.
Figure 7B:
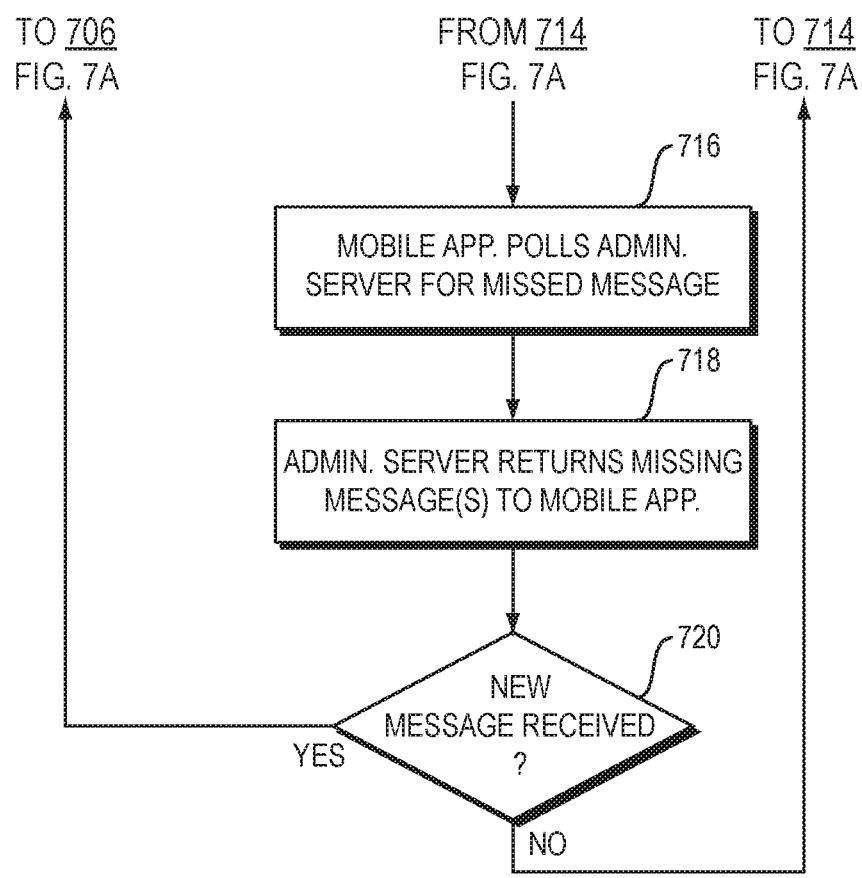

FIG. 6 shows examples of PSN data structures 218 (FIG. 2) used by PSN administrative application 216. A Setting object 600 and a Network table 604 together specify information needed to establish, operate and maintain PSN 100. A User table 606 corresponds with an authorized member (user) of the PSN 100. Properties of User table 606 include, inter alia, a user ID, name, email address, phone number, group name, and password. A Message object 608 corresponds with messages originated by an authorized member as described above. A Group table 612, Subgroup table 614, and Role table 616 together specify a given authorized member's group membership(s) and role(s) (i.e., PSN permissions).

A User Request object 602 corresponds with an authorized member's request to add another member to a particular established group as described above in connection with FIG. 5E.

A Network Request object 610 corresponds with a request to link two PSNs together as described below in connection with FIGS. 9-11.

With reference now to FIGS. 1-3, 7A and 7B, the higher level interactions among mobile devices 102*a* . . . 102*n*, administrative server 106, and push notification servers 104*a* . . . 104*n* are described. At step 700, an authorized participant of PSN 100, using PSN mobile application 312 running on one of mobile devices 102*a* . . . 102*n*, composes a message and addresses it to (a) another individual, authorized participant of PSN 100, (b) a predetermined group of authorized participants of PSN 100, or (c) to all authorized participants of PSN 100. Next, at step 702, PSN mobile application 312 appends location information (e.g., latitude and longitude) to the composed text, encrypts the entire message and stores a copy. At step 704, the encrypted message is transmitted to administrative server 106.

At step 706, administrative server 106 validates the received message, stores a copy in message archive, and creates a push notification distribution based on the authorized participants of PSN 100 to whom the validated message is addressed. The push notification distribution, which includes the encrypted message, is transmitted by administrative server 106 to push notification servers 104*a* . . . 104*n*. Next, at step 708, push notification servers 104*a* . . . 104*n*, using the push notification distribution, transmit push notifications, including the encrypted message, to the mobile devices 102*a* . . . 102*n* associated with the intended recipients of the message.

Each mobile device 102*a* . . . 102*n* which receives a push notification displays the notification even if PSN mobile application 312 is not open. If PSN mobile application 312 is open, the received, encrypted message is decrypted and also displayed. Next, at step 712, PSN mobile application stores a copy of the encrypted message.

PSN mobile application 312 includes a poll timer which is checked at step 714. If the poll timer has not yet expired, the process loops until expiration occurs. Expiration is followed by step 716 at which PSN mobile application 312 polls administrative server 106 to determine if application 312 failed to receive a previously transmitted message. This determination is done by PSN mobile application 312 transmitting a message ID (FIG. 6 at 608) of the most recent message it received. If administrative server 106 determines, based on that message ID, that there is a more recent message that was not received by PSN mobile application 312, the more recent message is returned to PSN mobile application 312 by PSN administrative server 106 at step 718.

As an alternative to the push notification approach described above, messages originated by authorized participants of PSN 100 may instead be distributed by a "pull" approach in which PSN mobile application 312 periodically polls administrative server 106. In this approach, PSN mobile application 312 periodically retrieves new messages from PSN administrative server 106 as opposed to polling for missed messages that were previously sent by push notifications.

At step 720, if a new message is received by administrative server 106, flow returns to step 706 for message validation. If no new message is received, flow returns to step 714.

Figure 8:
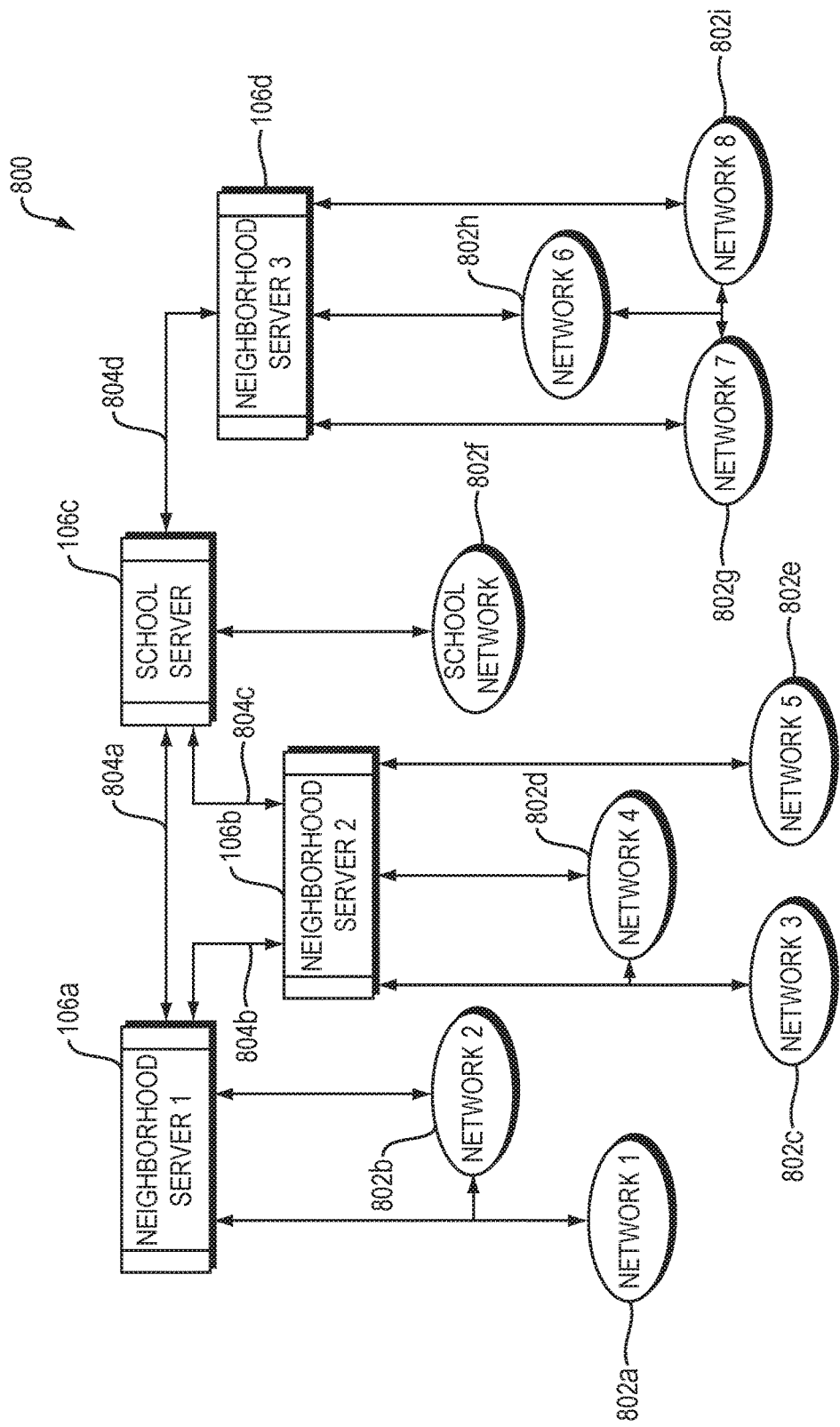
FIG. 8 is a schematic diagram showing a series of personal safety networks which have been linked together in accordance with one aspect of the invention.

As shown in FIG. 8, a linked PSNs environment 800 includes four administrative servers 106*a*, 106*b*, 106*c*, and 106*d* each of which includes functionality similar to administrative server 106 (FIG. 1). Administrative server 106*a* supports two personal safety networks 802*a* and 802*b* each of which provides functionality similar to that described above. For enhanced clarity, mobile devices and push notification servers have been omitted from FIG. 8. Each of administrative servers 106*b*, 106*c*, and 106*d* also supports multiple PSNs 802*c* . . . 802*i*.

As multiple PSNs are deployed across a given geographical area, school system, or commonly owned or controlled facilities, it may be desirable to link two or more PSNs together. For example, by linking multiple PSNs together, a larger number of authorized participants may be reached at once by a message addressed to "All" or an emergency broadcast message (FIG. 5B). This may be highly advantageous for dealing with threats or emergency situations affecting a wide geographic area as well as those where coordinated action among multiple organizations or facilities is needed.

As shown in FIG. 8, administrative server 106*a* has links 804*a* and 804*b*, respectively, to administrative server 106*c* and administrative server 106*b*. Through link 804*a*, PSNs 802*a* and 802*b* are effectively linked with PSN 802*f*. In order to establish a link between two PSNs, a request is made initially made by an authorized participant of one of the PSNs who has the necessary PSN permission.

Figure 9:
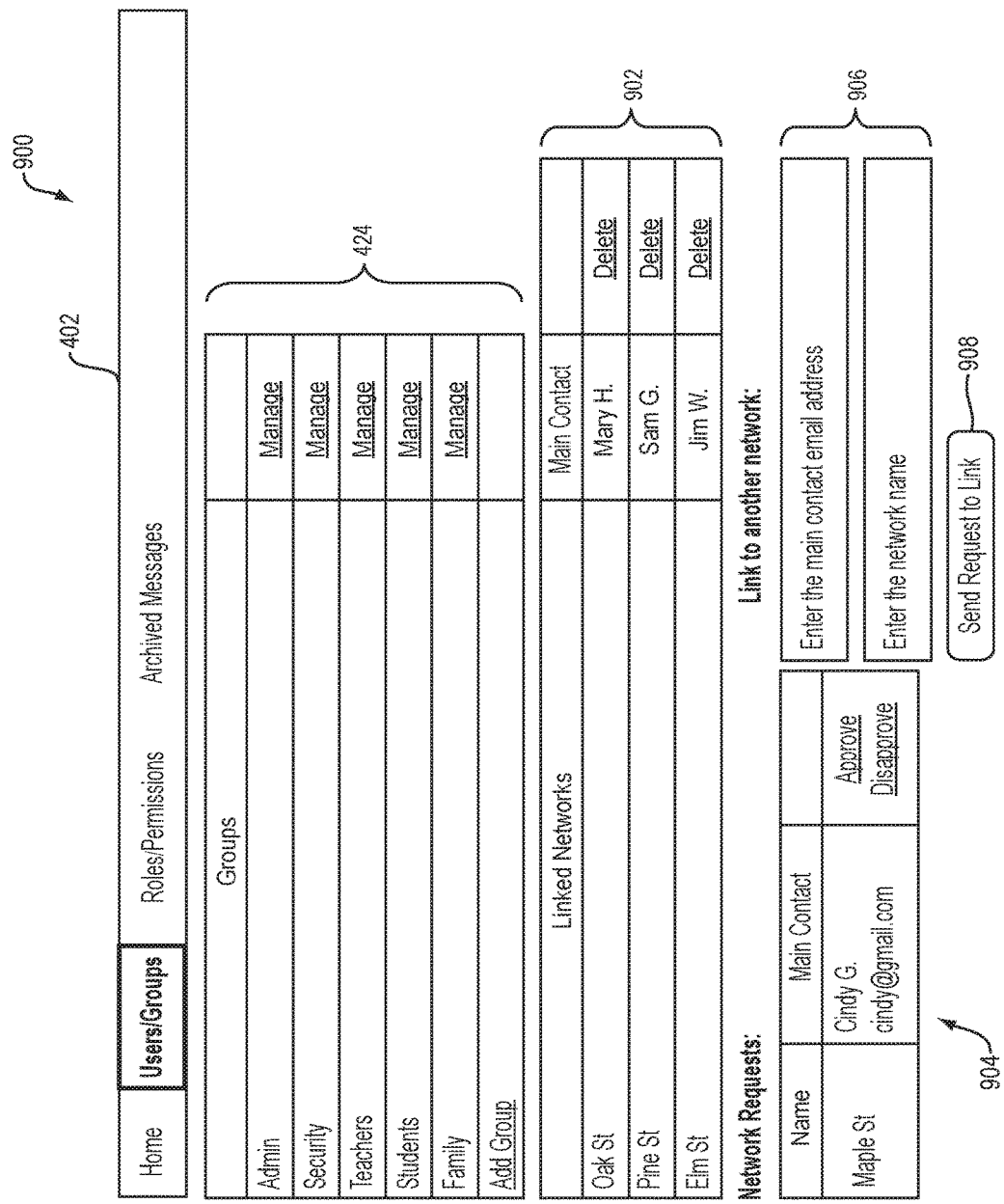
FIG. 9 is a representation of a users/groups page generated by the PSN administrative application shown in FIG. 2 which includes an ability to request to link one PSN with another PSN.

Referring now to FIG. 9, a users/groups page 900 of PSN administrative application 216 provides an administrator with the ability to both issue a request to link to another PSN as well as approve/disapprove similar requests received from other PSNs. A linked networks list 902 displays all currently linked PSNs including a main contact for each network. By clicking on a "Delete" link an administrator may sever the link to a particular. Also displayed is a pending request to link PSNs 904 which includes a network name, main contact, and links to approve/disapprove the request. Should an administrator which to make a request to link PSNs, he or she would fill in the information in boxes 906 (i.e., a PSN network name, a main contact name and email address), and press "Send Request to Link" button 908.

Figure 10:
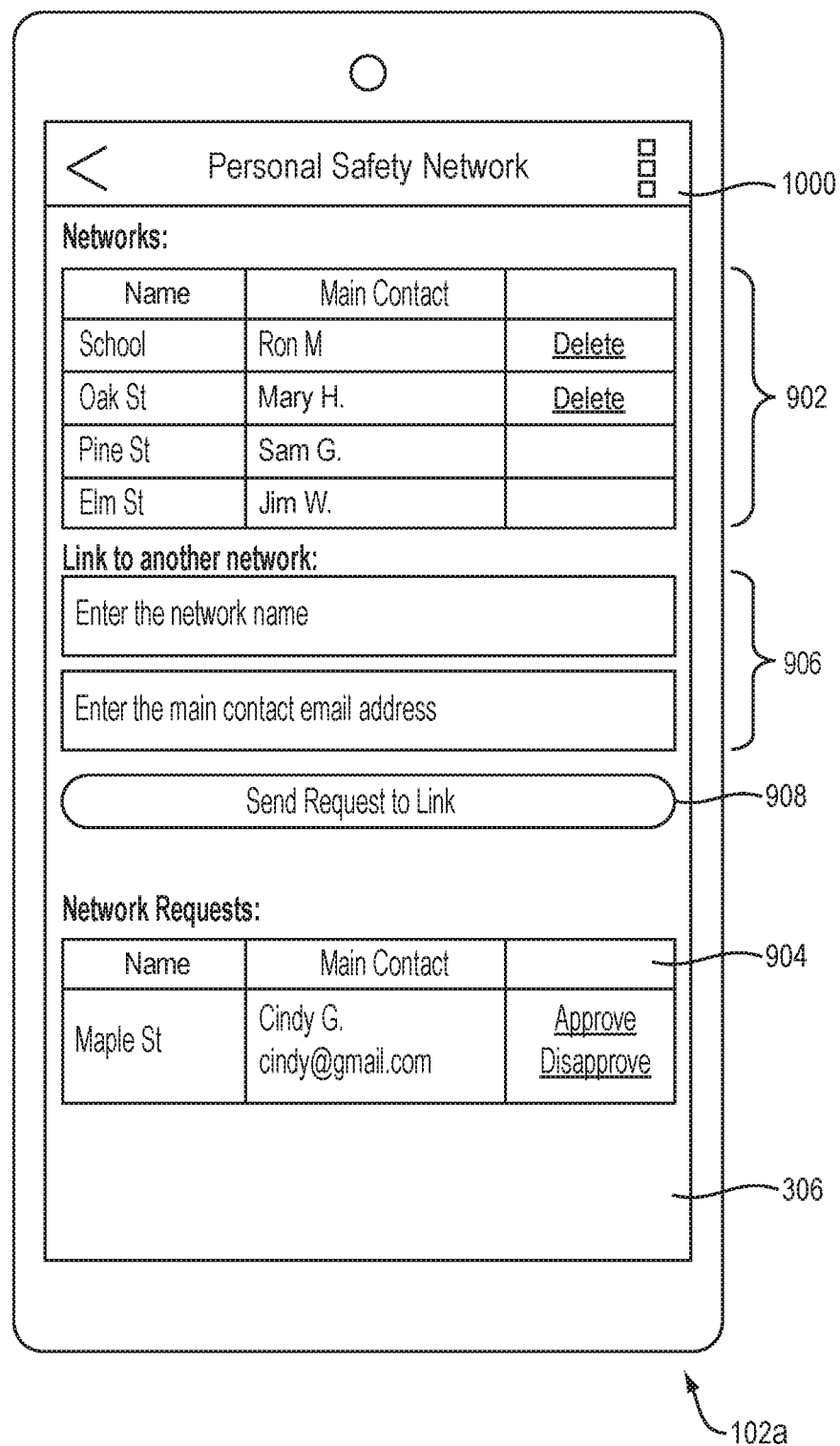
FIG. 10 is a representation of a networks page generated by the PSN mobile application shown in FIG. 3 which includes an ability to request to link one PSN with another PSN.

As shown in FIG. 10, functionality for requesting to link PSNs, and approving/disapproving requests, may also be provided in PSN mobile application 312. A PSN networks page 1000 displays information and controls similar to those shown in FIG. 9.

Figure 11:
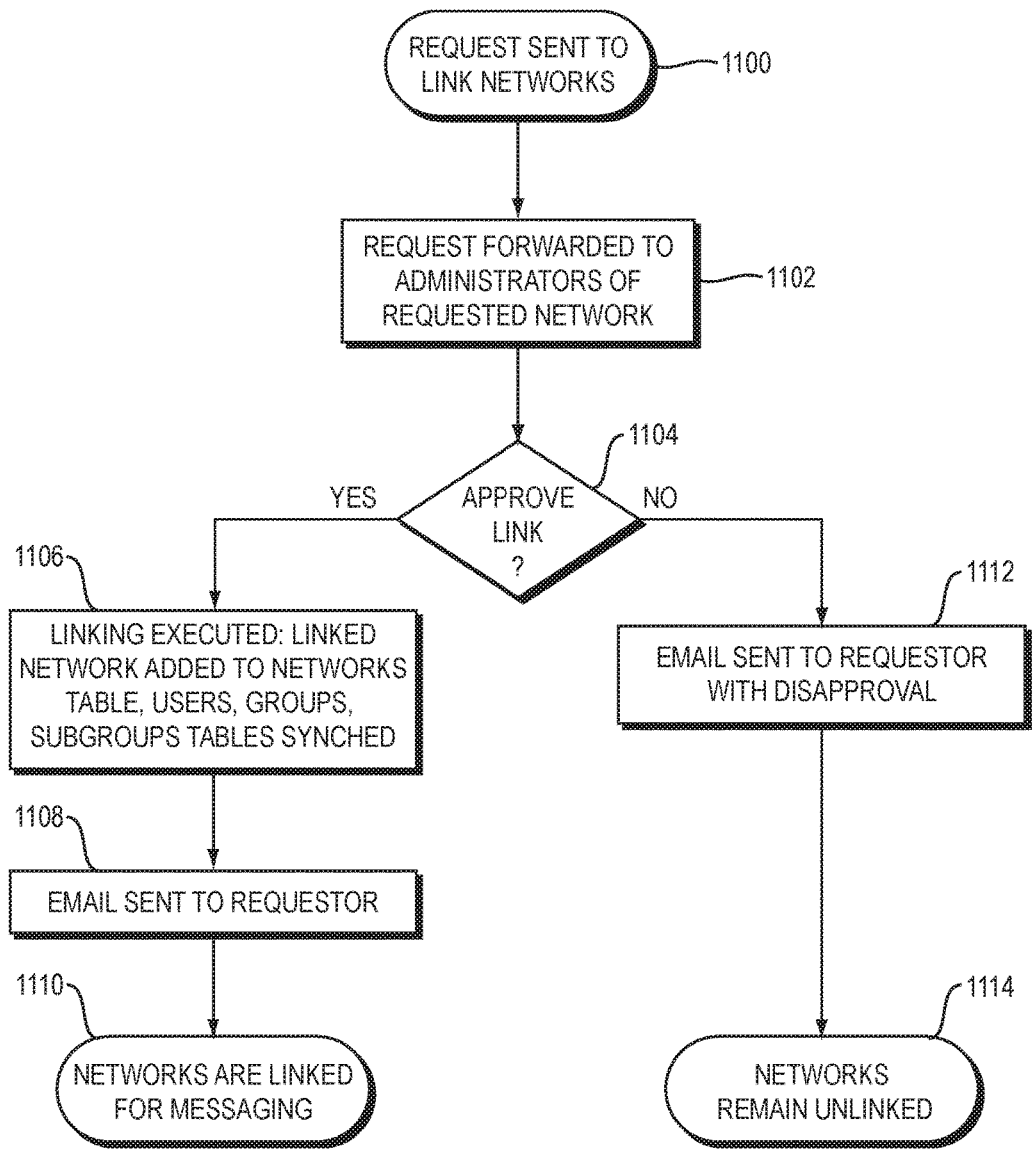
FIG. 11 is a flowchart illustrating higher level interactions with respect to a request to link one PSN to another PSN.

As shown in FIG. 11, at step 1100, a request to link PSNs is prepared as described above. The request is sent by email addressed or forwarded to an administrator (or other authorized member) of a PSN as shown in step 1102. The administrator who receives a request to link then approves or disapproves the request at step 1104. If the request is approved, at step 1106, each of PSN administrative applications 216 of the two linked networks adds the other network to its Network table 604, and synchronizes its User table 606, Group table 612, and Subgroup table 614. Next, at step 1108 an email is sent to the requestor confirming approval. As a result, at step 110, two PSN are now linked for messaging and each of PSN administrative applications 216 of the two linked networks recognizes all of the authorized participants of both of the linked networks. Alternatively, if the request to link is disapproved at step 1104, an email is sent to the requestor advising of disapproval at step 1112, and the two PSNs remain unlinked at step 1114.

Figure 12:
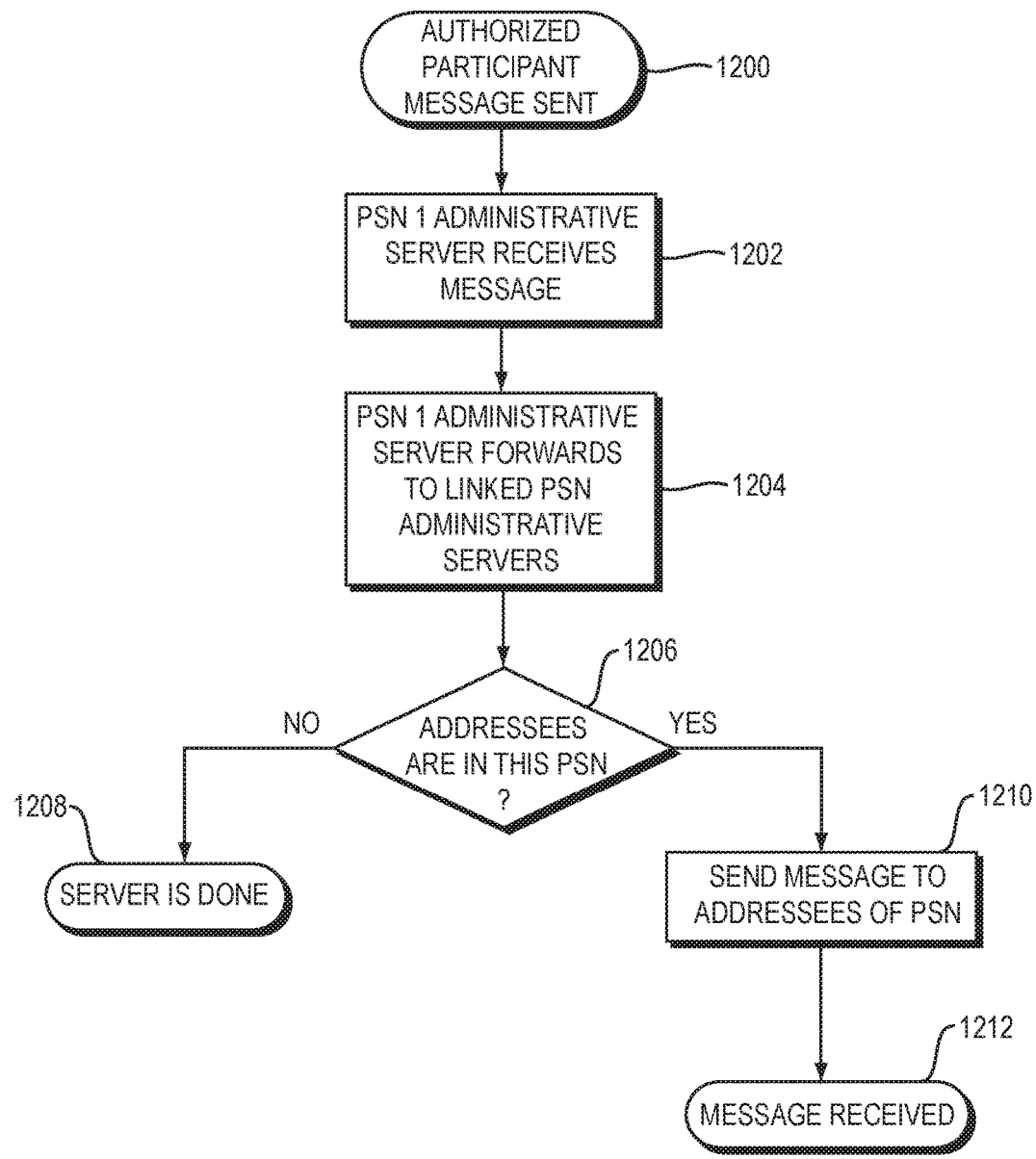
FIG. 12 is a flowchart illustrating how messages originated by authorized participants of a first PSN are delivered to authorized participants of other PSNs which are linked to the first PSN.

FIG. 12 is a flowchart illustrating how messages originated by authorized participants are delivered across linked PSNs. At step 1200, an authorized participant originates a message which is addressed to an individual authorized participant, the members of a group of authorized participants, or all authorized participants, as previously described. At step 1202, an administrative server 106 of a first PSN (PSN 1) receives the message and, at step 1204, forwards the message to each counterpart administrative server 106 for each PSN which is linked to PSN 1.

Next, at step 1206, following receipt of a forwarded message, each administrative server 106, through its PSN administrative application 216, determines whether any addressee(s) of the forwarded message is part of the PSN associated with that administrative server. If not, at step 1208, administrative server 106 is done. If so, then at step 1210 administrative server 106 creates a push notification distribution for the forwarded message in a manner similar to that described above. At step 1212, the forwarded message is received.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. It is thus the object of the appended claims to cover all such variations and modifications as come within the true spirit and scope of the invention.

What is claimed is:

1. A personal safety network comprising:
a plurality of wireless communication devices, each of said wireless communication devices associated with one of a plurality of authorized personal safety network participants, each of said wireless communication devices running a mobile application operable to register with an administrative server, to originate messages by a first one of said plurality of authorized personal safety network participants, to wirelessly transmit said messages to said administrative server, and wirelessly receive push notifications related to said messages from a push notification server;

said administrative server running an administrative application, said administrative application operable to create and maintain an identification record for each of said plurality of authorized personal safety network participants, to organize said plurality of authorized personal safety network participants into members of one or more groups, each of said members having a personal safety network permission, said personal safety network permission enabling each of said messages to be effectively addressed to a second one of said plurality of authorized personal safety network participants or each of the members of at least one of said one or more groups, to convert at least one of said messages into a push notification distribution, and to forward said push notification distribution to said push notification server;

said push notification server coupled in communicating relationship with said administrative server, said push notification server operable, in response to receiving said push notification distribution, to transmit push notifications, which include information from at least one of said messages, to each of said plurality of wireless communication devices which is associated with each of the authorized personal safety network participants to whom said at least one of said messages is addressed; and wherein said plurality of mobile devices, said administrative server, and said push notification server cooperate to enable distribution of virtually real-time, multi-way, messaging among all of the members of said at least one of said one or more groups.

2. The network as in claim 1 wherein at least one of said messages includes information identifying a geographical location of one of said plurality of wireless communication devices which originated said at least one of said messages.

3. The network as in claim 1 wherein said mobile application includes an emergency broadcast operable to transmit an emergency message to each of said plurality of wireless communication devices by an emergency push notification distribution.

4. The network as in claim 1 wherein at least one of said messages is addressed to all of said plurality of authorized personal safety network participants.

5. The network as in claim 1 wherein at least one of said messages is addressed to only one of said plurality of authorized personal safety network participants.

6. The network as in claim 1 wherein at least one of said messages is addressed to all members of at least one of said one or more groups of said plurality of authorized personal safety network participants.

7. The network as in claim 1 wherein following receipt of said push notification distribution, one of said plurality of wireless communication devices originates a response message which is related by subject matter to said at least one of said messages.

8. The network as in claim 7 wherein said response message is transmitted only to one of said plurality of wireless communication devices which originated said at least one of said messages.

9. The network as in claim 7 wherein said response message is transmitted to all of the members of the group which received said push notification distribution related to said at least one of said messages.

10. The network as in claim 7 wherein said response message is transmitted to all of said plurality of authorized personal safety network participants.

11. The network as in claim 1 wherein said messages are encrypted prior to transmission to the administrative server.

12. The network as in claim 1 wherein said push notification distribution is encrypted prior to transmission to said push notification server.

13. The network as in claim 1 wherein said messages are stored in encrypted form by said administrative server.

14. The network as in claim 1 wherein said mobile application periodically polls said administrative application to determine whether said mobile application failed to receive one of said messages through said push notifications.

15. A method for establishing an expanded personal safety network, said method comprising the steps of:

establishing a first personal safety network (first PSN) having a first plurality of wireless communication devices each of which is running a first PSN mobile application, each of said first plurality of wireless communication devices associated with one of a plurality of authorized first PSN participants, a first PSN administrative server running a first PSN administrative application, and a first PSN push notification server, wherein said first plurality of wireless communication devices, said first PSN administrative server, and said first PSN push notification server cooperate to enable distribution of virtually real-time, multi-way, messaging among up to all of said plurality of authorized first PSN participants;

establishing a second personal safety network (second PSN) having a second plurality of wireless communication devices each of which is running a second PSN mobile application, each of said second plurality of wireless communication devices associated with one of a plurality of authorized second PSN participants, a second PSN administrative server running a second PSN administrative application, and a second PSN push notification server, wherein said second plurality of wireless communication devices, said second PSN administrative server, and said second PSN push notification server cooperate to enable distribution of virtually real-time, multi-way, messaging among up to all of said plurality of authorized second PSN participants;

transmitting a request to link from said first PSN to said second PSN;

approving said request;

updating said first PSN administrative application to recognize said plurality of authorized second PSN participants; and updating said second PSN administrative application to recognize said plurality of authorized first PSN participants.

16. The method as in claim 15 wherein said first PSN mobile application periodically polls said first PSN administrative application to determine whether said first PSN mobile application failed to receive one said messages through said push notifications.

17. The method as in claim 15 wherein said real-time, multi-way messaging in said first PSN includes information identifying a geographical location of at least one of said first plurality of wireless communication devices.

18. The method as in claim 15 wherein said first PSN administrative application is operable to organize said first plurality of authorized first PSN participants into members of one or more groups.

19. The method as in claim 15 wherein said first PSN mobile application is operable to transmit an emergency message to each of said first plurality of wireless communication devices by an emergency push notification distribution.

20. The method as in claim 15 wherein said first PSN mobile application is operable to display said real-time, multi-way messaging in said first PSN in a reverse chronological, continuing conversation format on at least one of said first plurality of wireless communication devices.

21. The method as in claim 15 wherein said first PSN mobile application is operable to transmit an emergency message to all of said first plurality of wireless communication devices and all of said second plurality of wireless communication devices.

22. The method as in claim 15 wherein each of said first PSN mobile application and said second PSN mobile application is operable to display said real-time, multi-way messaging in said first PSN in a reverse chronological, continuing conversation format on at least one of said first plurality of wireless communication devices and at least one of said second plurality of wireless communication devices.

23. A personal safety network comprising:

a plurality of wireless communication devices, each of said wireless communication devices associated with one of a plurality of authorized personal safety network participants, each of said wireless communication devices running a mobile application operable to register with an administrative server, to originate outbound messages by a first one of said plurality of authorized personal safety network participants, to wirelessly transmit said outbound messages to said administrative server, and to wirelessly pull inbound messages from said administrative server by polling said administrative server;

said administrative server running an administrative application, said administrative application operable to create and maintain an identification record for each of said plurality of authorized personal safety network participants, to organize said plurality of authorized personal safety network participants into members of one or more groups, each of said members having a personal safety network permission, said personal safety network permission enabling each of said messages to be effectively addressed to a second one of said plurality of authorized personal safety network participants or each of the members of at least one of said one or more groups; and wherein said plurality of mobile devices and said administrative server cooperate to enable distribution of virtually real-time, multi-way, messaging among all of the members of said at least one of said one or more groups.

24. The network as in claim 23 wherein at least one of said outbound messages includes information identifying a geographical location of one of said plurality of wireless communication devices which originated said at least one of said outbound messages.

25. The network as in claim 23 wherein said mobile application includes an emergency broadcast operable to transmit an emergency message to each of said plurality of wireless communication devices.

26. The network as in claim 23 wherein at least one of said outbound messages is addressed to all of said plurality of authorized personal safety network participants.

27. The network as in claim 23 wherein at least one of said outbound messages is addressed to only one of said plurality of authorized personal safety network participants.

28. The network as in claim 23 wherein at least one of said outbound messages is addressed to all members of at least one of said one or more groups of said plurality of authorized personal safety network participants.

29. The network as in claim 23 wherein following receipt of at least one of said inbound messages, one of said plurality of wireless communication devices originates an outbound response message which is related by subject matter to said at least one of said inbound messages.

30. The network as in claim 29 wherein said outbound response message is transmitted only to one of said plurality of wireless communication devices which originated said at least one of said inbound messages.

31. The network as in claim 29 wherein said outbound response message is transmitted to all of the members of the group which received said at least one of said inbound messages.

32. The network as in claim 29 wherein said outbound response message is transmitted to all of said plurality of authorized personal safety network participants.

33. The network as in claim 23 wherein said outbound messages are encrypted prior to transmission to said administrative server.

34. The network as in claim 23 wherein said outbound messages are transmitted to said administrative server and stored in encrypted form.

* * * * *